US010786971B2

(12) United States Patent
Roberts

(10) Patent No.: US 10,786,971 B2
(45) Date of Patent: *Sep. 29, 2020

(54) METHOD FOR MAKING A RUNNING BOARD HAVING AN IN-SITU FOAM CORE

(71) Applicant: Richard W. Roberts, Tecumseh, MI (US)

(72) Inventor: Richard W. Roberts, Tecumseh, MI (US)

( * ) Notice: Subject to any disclaimer, the term of this patent is extended or adjusted under 35 U.S.C. 154(b) by 509 days.

This patent is subject to a terminal disclaimer.

(21) Appl. No.: 15/441,077

(22) Filed: Feb. 23, 2017

(65) Prior Publication Data
US 2017/0157892 A1 Jun. 8, 2017

Related U.S. Application Data

(60) Division of application No. 13/463,738, filed on May 3, 2012, now abandoned, which is a (Continued)

(51) Int. Cl.
*B32B 5/20* (2006.01)
*B29C 49/42* (2006.01)
(Continued)

(52) U.S. Cl.
CPC .............. *B32B 5/20* (2013.01); *A63G 21/02* (2013.01); *B29C 44/04* (2013.01); *B29C 44/14* (2013.01); *B29C 44/18* (2013.01); *B29C 44/343* (2013.01); *B29C 45/1615* (2013.01); *B29C 45/1704* (2013.01); *B29C 49/4273* (2013.01);
(Continued)

(58) Field of Classification Search
CPC ............ B29K 2105/04; B29K 2023/12; B29K 2105/048; B29C 44/18; B29C 44/445; B29C 44/343; B29C 44/3426; B29C 44/3415; B29C 49/04; B29C 49/4273; B29C 2049/4691; B29C 2049/6072;
(Continued)

(56) References Cited

U.S. PATENT DOCUMENTS 776,342 A 11/1904 McCormick
1,588,778 A 6/1926 Sorensen
(Continued)

FOREIGN PATENT DOCUMENTS

EP 0542302 5/1993
EP 0583542 2/1994
(Continued)

OTHER PUBLICATIONS

Website www.jsp.com, 2006, "Arplank, Expanded bead foam packaging materials, Material Properties, Auto/Mil Specs." 21 Pages.
(Continued)

*Primary Examiner* — Zachary L Kuhfuss
(74) *Attorney, Agent, or Firm* — Brooks Kushman P.C.

(57) ABSTRACT

A plastic article is recited having a plastic shell including walls defining a cavity. Within the cavity is an in-situ foam core including expanded polymer beads. A layer of the expanded polymer beads includes a layer of distorted beads adjacent to the walls. The in-situ foam core has a thermal bond to the walls.

8 Claims, 14 Drawing Sheets

Related U.S. Application Data continuation-in-part of application No. 12/913,132, filed on Oct. 27, 2010, now Pat. No. 8,342,420.

(60) Provisional application No. 61/617,047, filed on Mar. 29, 2012.

(51) Int. Cl.

| | | |
|---|---|---|
| *E01B 3/44* | (2006.01) | |
| *B60R 19/03* | (2006.01) | |
| *B29C 44/18* | (2006.01) | |
| *B29C 44/04* | (2006.01) | |
| *B29C 44/34* | (2006.01) | |
| *B29C 45/17* | (2006.01) | |
| *B29C 45/16* | (2006.01) | |
| *A63G 21/02* | (2006.01) | |
| *B29C 44/14* | (2006.01) | |
| *B32B 7/10* | (2006.01) | |
| *B32B 27/06* | (2006.01) | |
| *B60P 1/43* | (2006.01) | |
| *B60R 3/00* | (2006.01) | |
| *B62B 3/00* | (2006.01) | |
| *B62D 35/00* | (2006.01) | |
| *B63B 22/00* | (2006.01) | |
| *B65D 6/00* | (2006.01) | |
| *B65G 69/30* | (2006.01) | |
| *D06F 81/00* | (2006.01) | |
| *E01F 15/14* | (2006.01) | |
| *E02B 15/06* | (2006.01) | |
| *E04F 15/18* | (2006.01) | |
| *E04F 19/02* | (2006.01) | |
| *E04H 1/12* | (2006.01) | |
| *B29K 105/04* | (2006.01) | |
| *B29C 49/04* | (2006.01) | |
| *B60R 19/18* | (2006.01) | |
| *B29K 23/00* | (2006.01) | |
| *B29K 55/00* | (2006.01) | |
| *B29L 31/10* | (2006.01) | |
| *B29L 31/30* | (2006.01) | |
| *B29L 31/52* | (2006.01) | |
| *B29L 31/00* | (2006.01) | |

(52) U.S. Cl.
CPC .............. *B32B 7/10* (2013.01); *B32B 27/065* (2013.01); *B60P 1/43* (2013.01); *B60R 3/002* (2013.01); *B60R 19/03* (2013.01); *B62B 3/002* (2013.01); *B62D 35/007* (2013.01); *B63B 22/00* (2013.01); *B65D 11/20* (2013.01); *B65G 69/30* (2013.01); *D06F 81/00* (2013.01); *E01B 3/44* (2013.01); *E01F 15/14* (2013.01); *E02B 15/06* (2013.01); *E04F 15/18* (2013.01); *E04F 19/02* (2013.01); *E04H 1/1205* (2013.01); *B29C 49/04* (2013.01); *B29C 2791/001* (2013.01); *B29K 2023/18* (2013.01); *B29K 2055/00* (2013.01); *B29K 2105/04* (2013.01); *B29L 2031/10* (2013.01); *B29L 2031/3005* (2013.01); *B29L 2031/3067* (2013.01); *B29L 2031/5209* (2013.01); *B29L 2031/712* (2013.01); *B32B 2266/025* (2013.01); *B32B 2419/00* (2013.01); *B32B 2439/00* (2013.01); *B32B 2605/00* (2013.01); *B32B 2605/12* (2013.01); *B60R 2019/1873* (2013.01); *Y10T 428/1376* (2015.01)

(58) Field of Classification Search
CPC ... B32B 5/20; B32B 27/065; B32B 2266/025; B32B 2605/00
See application file for complete search history.

(56) References Cited

U.S. PATENT DOCUMENTS

| | | |
|---|---|---|
| 2,292,369 A | 8/1942 | Gordon |
| 2,784,417 A | 3/1957 | Strand |
| 2,983,963 A | 5/1961 | Jodell et al. |
| 3,062,337 A | 11/1962 | Zittle |
| 3,111,787 A | 11/1963 | Chamberlain |
| 3,132,417 A | 5/1964 | Irwin |
| 3,277,220 A | 10/1966 | Plymale et al. |
| 3,389,195 A | 6/1968 | Gianakos et al. |
| 3,400,429 A | 9/1968 | Ludwig |
| 3,466,700 A | 9/1969 | Harrison |
| 3,468,097 A | 9/1969 | Mack |
| 3,563,845 A | 2/1971 | Stevens |
| 3,598,312 A | 8/1971 | Hamilton |
| 3,745,998 A | 7/1973 | Rose |
| 3,774,968 A | 11/1973 | Fenton |
| 3,813,040 A | 5/1974 | Heinemeyer |
| 3,935,044 A | 1/1976 | Daly |
| 4,361,656 A | 11/1982 | Mostafa |
| 4,457,729 A | 7/1984 | Peerlkamp |
| 4,492,663 A | 1/1985 | Reinfeld et al. |
| 4,546,899 A | 10/1985 | Williams |
| 4,573,741 A | 3/1986 | Kirchner-Carl |
| 4,621,002 A | 11/1986 | Kuhlmann et al. |
| 4,651,494 A | 3/1987 | Van Wagoner |
| 4,680,909 A | 7/1987 | Stewart |
| 4,762,438 A | 8/1988 | Dewing |
| 4,825,089 A | 4/1989 | Lindsay |
| 4,840,973 A | 6/1989 | Kuwabara et al. |
| 4,961,715 A | 10/1990 | Shanelec |
| 5,018,329 A | 5/1991 | Hasan et al. |
| 5,023,042 A | 6/1991 | Efferding |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,275,860 A | 1/1994 | D'Luzansky et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,580,621 A | 12/1996 | Kuszaj et al. |
| 5,624,517 A | 4/1997 | Giesen et al. |
| 5,665,285 A | 9/1997 | Hattori et al. |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A | 7/1998 | Slaven |
| 5,824,261 A | 10/1998 | Berdan |
| 5,858,159 A | 1/1999 | Holbrook et al. |
| 5,858,288 A * | 1/1999 | Bullard ............... B29C 44/3403 264/102 |
| 5,866,224 A | 2/1999 | Ang et al. |
| 5,956,905 A | 9/1999 | Weidrich |
| 6,050,579 A * | 4/2000 | Selland ................. B29C 44/18 280/163 |
| 6,086,145 A | 7/2000 | Wandyez |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,286,879 B1 | 9/2001 | Haque et al. |
| 6,358,462 B1 * | 3/2002 | Miehls ................. B29C 49/66 264/526 |
| 6,375,892 B2 | 4/2002 | Thomas |
| 6,605,343 B1 | 8/2003 | Motoi et al. |
| 6,607,680 B1 | 8/2003 | Moitzheim |
| 6,685,333 B1 | 2/2004 | Bieberdorf |
| 6,692,183 B2 | 2/2004 | Godfrey |

(56) References Cited

U.S. PATENT DOCUMENTS

| | | | |
|---|---|---|---|
| 6,759,003 B1* | 7/2004 | Obara | B29C 49/4802 |
| | | | 264/529 |
| 6,931,809 B1 | 8/2005 | Brown et al. | |
| 6,938,968 B2 | 9/2005 | Tanimoto et al. | |
| 6,955,576 B2 | 10/2005 | Yeh | |
| 6,972,144 B2 | 12/2005 | Roth et al. | |
| 7,097,794 B2* | 8/2006 | McLeod | B29C 44/18 |
| | | | 264/275 |
| 7,201,112 B2 | 4/2007 | Jolley | |
| 7,201,625 B2 | 4/2007 | Yeh | |
| 7,219,479 B2 | 5/2007 | Durning et al. | |
| 7,358,280 B2 | 4/2008 | Berghmans et al. | |
| 7,377,828 B2 | 5/2008 | Cheung | |
| 7,401,998 B2 | 7/2008 | Wilson et al. | |
| 7,485,352 B2 | 2/2009 | Yuasa et al. | |
| 7,537,413 B1 | 5/2009 | Brugos | |
| 7,670,202 B2 | 3/2010 | Yeh | |
| 7,931,210 B1 | 4/2011 | Pike et al. | |
| 7,950,592 B2 | 5/2011 | Yuan | |
| 7,976,749 B2 | 7/2011 | Volkel et al. | |
| 8,181,288 B1 | 5/2012 | Davis, Jr. | |
| 8,342,420 B2* | 1/2013 | Roberts, Jr. | B29C 44/18 |
| | | | 238/54 |
| 8,708,177 B2* | 4/2014 | Roberts | B29C 44/445 |
| | | | 174/5 R |
| 9,102,086 B2* | 8/2015 | Roberts | B29C 44/206 |
| 9,193,099 B2* | 11/2015 | Gomibuchi | B29C 44/18 |
| 9,346,237 B2* | 5/2016 | Roberts, Jr. | B32B 1/08 |
| 9,636,854 B2* | 5/2017 | Gomibuchi | B29C 44/18 |
| 9,688,046 B2* | 6/2017 | Roberts | B29C 44/206 |
| 10,130,220 B2* | 11/2018 | Roberts | A47K 3/1605 |
| 10,207,606 B2* | 2/2019 | Roberts | B60N 2/42709 |
| 10,328,662 B2* | 6/2019 | Roberts | B32B 3/266 |
| 10,391,699 B2* | 8/2019 | Roberts | B29C 44/18 |
| 10,391,700 B2* | 8/2019 | Roberts | B29C 44/445 |
| 2001/0035658 A1 | 11/2001 | Anderson et al. | |
| 2002/0124531 A1 | 9/2002 | Mossbeck et al. | |
| 2003/0081999 A1 | 5/2003 | Godfrey | |
| 2003/0181536 A1 | 9/2003 | Roth | |
| 2003/0209828 A1 | 11/2003 | Nohara et al. | |
| 2003/0224675 A1 | 12/2003 | Yeh | |
| 2004/0172964 A1 | 9/2004 | Brachert et al. | |
| 2004/0176001 A1 | 9/2004 | Yeh | |
| 2004/0232254 A1 | 11/2004 | Kowalski | |
| 2005/0001048 A1 | 1/2005 | Skoblenick et al. | |
| 2005/0101201 A1 | 5/2005 | Yeh | |
| 2005/0188637 A1 | 9/2005 | Yeh | |
| 2005/0215138 A1 | 9/2005 | Yeh | |
| 2005/0272323 A1 | 12/2005 | Yeh | |
| 2006/0003044 A1 | 1/2006 | Dinello et al. | |
| 2006/0030467 A1 | 2/2006 | Mellott | |
| 2006/0078382 A1 | 4/2006 | Wilson et al. | |
| 2006/0105650 A1 | 5/2006 | Yeh | |
| 2006/0110993 A1 | 5/2006 | Yeh | |
| 2006/0131437 A1 | 6/2006 | Thiagarajan et al. | |
| 2006/0134401 A1 | 6/2006 | Yeh | |
| 2006/0223897 A1 | 10/2006 | Sasaki | |
| 2007/0015421 A1 | 1/2007 | Yeh | |
| 2007/0040293 A1 | 2/2007 | Lane et al. | |
| 2007/0160798 A1 | 7/2007 | Yeh | |
| 2007/0180847 A1 | 8/2007 | Schabron et al. | |
| 2008/0018161 A1 | 1/2008 | Evans | |
| 2008/0048462 A1 | 2/2008 | Zabik | |
| 2008/0081153 A1 | 4/2008 | Yeh | |
| 2008/0083835 A1 | 4/2008 | Girardi et al. | |
| 2008/0125502 A1 | 5/2008 | Reichman et al. | |
| 2008/0142611 A1 | 6/2008 | Scobie | |
| 2008/0166539 A1 | 7/2008 | Yeh | |
| 2008/0242169 A1 | 10/2008 | Yeh | |
| 2008/0275148 A1 | 11/2008 | Tokiwa et al. | |
| 2008/0305304 A1 | 12/2008 | Yeh | |
| 2009/0011667 A1 | 1/2009 | Hayward et al. | |
| 2009/0100780 A1 | 4/2009 | Mathis et al. | |
| 2009/0133354 A1 | 5/2009 | Spear et al. | |
| 2010/0028654 A1 | 2/2010 | Takase et al. | |
| 2010/0116180 A1 | 5/2010 | Roth et al. | |
| 2011/0115120 A1 | 5/2011 | Hattori et al. | |
| 2011/0180959 A1 | 7/2011 | Donnelly et al. | |
| 2012/0031912 A1 | 2/2012 | Wang | |
| 2012/0102884 A1 | 5/2012 | Roberts, Jr. | |
| 2012/0104110 A1 | 5/2012 | Roberts, Jr. | |
| 2012/0240451 A1 | 9/2012 | Ricks | |
| 2012/0328889 A1 | 12/2012 | Hayashi et al. | |
| 2013/0140860 A1 | 6/2013 | Naughton et al. | |
| 2013/0175725 A1 | 7/2013 | Tokiwa et al. | |
| 2013/0255176 A1* | 10/2013 | Roberts | E04C 1/40 |
| | | | 52/582.1 |
| 2013/0256317 A1* | 10/2013 | Roberts | F25D 23/063 |
| | | | 220/592.1 |
| 2013/0257069 A1* | 10/2013 | Roberts | B60R 19/22 |
| | | | 293/120 |
| 2013/0260080 A1* | 10/2013 | Roberts | B29C 44/08 |
| | | | 428/71 |
| 2014/0075666 A1 | 3/2014 | Campbell et al. | |
| 2015/0064379 A1 | 3/2015 | Roberts | |
| 2017/0157892 A1* | 6/2017 | Roberts | E01F 15/14 |

FOREIGN PATENT DOCUMENTS

| | | |
|---|---|---|
| EP | 0535147 | 9/1996 |
| EP | 1987934 | 11/2008 |
| JP | 68213028 | 12/1983 |
| JP | S59145125 | 8/1984 |
| JP | 69155443 | 9/1984 |
| JP | 69210954 | 11/1984 |
| JP | 60090744 | 5/1985 |
| JP | H06166112 | 6/1994 |
| JP | H07195536 | 8/1995 |
| JP | 2010046920 | 3/2010 |
| WO | 9119867 | 12/1991 |
| WO | 2008121754 | 10/2008 |
| WO | 2011103284 | 8/2011 |

OTHER PUBLICATIONS

Website, Manning, www.mmh.com Oct. 2008, Retrieved on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

Partial Supplementary European Search Report for European Application No. 13769879.1, Completed by the European Patent Office, dated Nov. 25, 2015, 9 Pages.

GB Examination Report for GB 1308511.3, Completed by the GB Patent Office, dated Aug. 10, 2016, 5 Pages.

Vehicle Certification Agency Seat Strength Test Report, Oct. 25, 2007, Test Report ESH178571, pp. 1-6.

ECE Agreement, Regulation No. 17, Jul. 31, 2002.

National Highway Traffic Safety Admin., DOT. 49 C.F.R. § Part 581, Undated.

Extended European Search Report for European Application No. EP 13769879.1, Completed by the European Patent Office, dated May 11, 2016, 20 Pages.

* cited by examiner

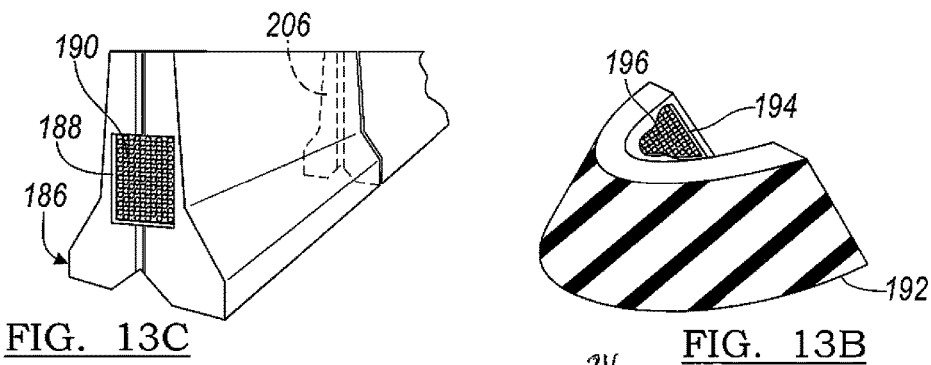
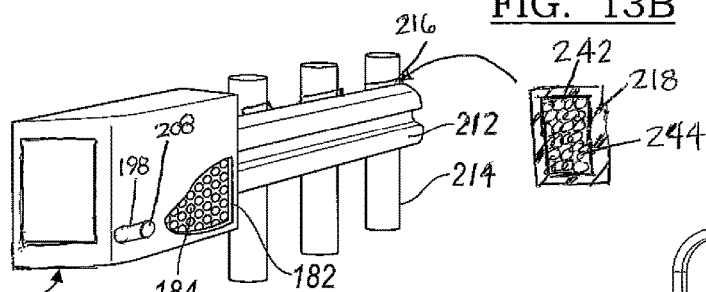
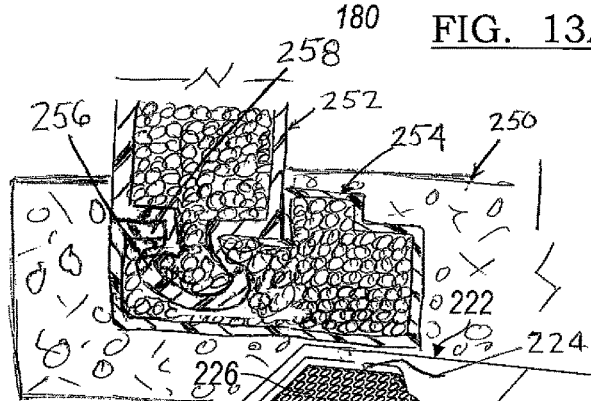
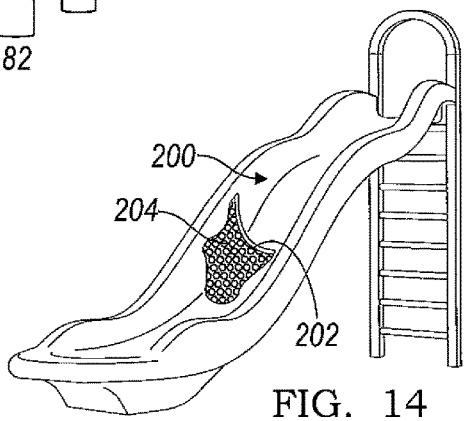
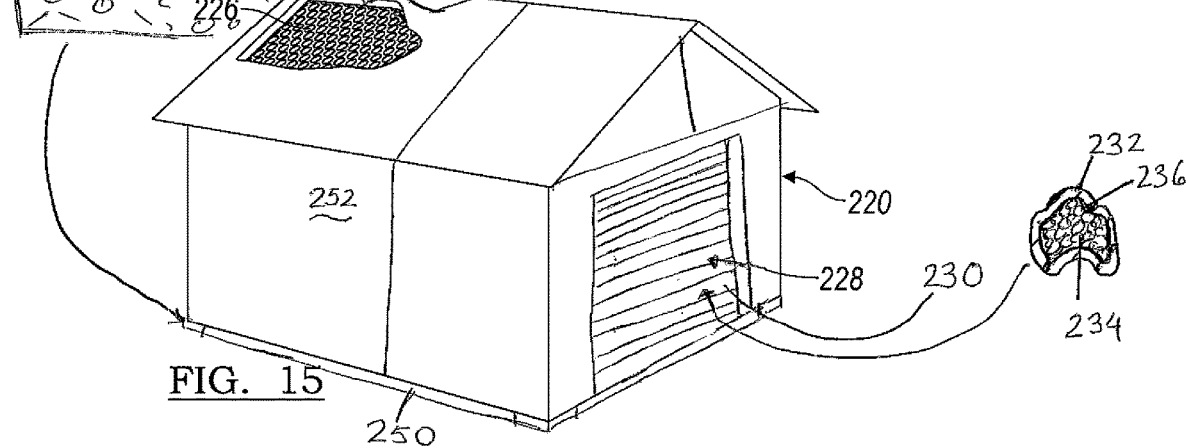

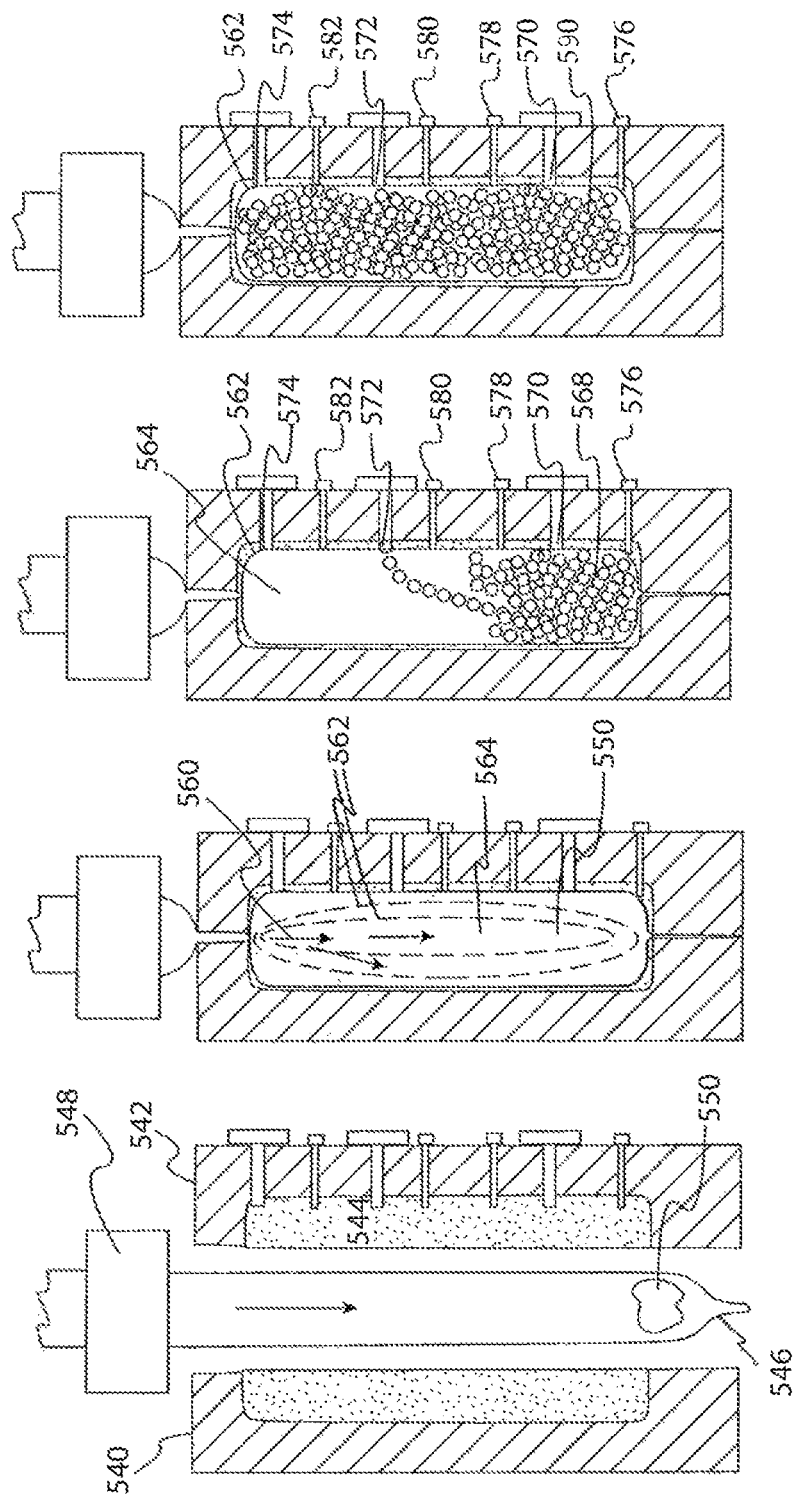

METHOD FOR MAKING A RUNNING BOARD HAVING AN IN-SITU FOAM CORE

CROSS-REFERENCE TO RELATED APPLICATIONS

This application is a divisional of U.S. application Ser. No. 13/463,738 filed May 3, 2012 which claims priority to and is a continuation-in-part of U.S. application Ser. No. 12/913,132 filed Oct. 27, 2010, the disclosure of which is incorporated in its entirety by reference herein. This application also claims the benefit of U.S. Provisional Application No. 61/617,047 filed Mar. 29, 2012, the disclosure of which is incorporated in its entirety by reference herein.

TECHNICAL FIELD

The disclosed embodiments relate to in-situ foam core articles.

BACKGROUND

Articles currently available and not an incorporating in-situ foam core have various deficiencies with regard to absorbing water, management of energy, lack of structure, excessive weight, or biological degradation.

SUMMARY

A plastic article is recited having a plastic shell including walls defining a cavity. Within the cavity is an in-situ foam core including expanded polymer beads. A layer of the expanded polymer beads includes a layer of distorted beads. The in-situ form core has a thermal bond to the walls.

BRIEF DESCRIPTION OF THE DRAWINGS

FIG. 13A-C schematically illustrates in an isometric view of highway bumper systems according to at least one embodiment;

FIG. 14 schematically illustrates an isometric view of a playground slide according to at least one embodiment;

FIG. 15 schematically illustrates an isometric view of a storage shed according to at least one embodiment;

FIGS. 18A-18D diagrammatically illustrates a method of producing an article having an in-situ foam core according to another embodiment.

DETAILED DESCRIPTION

Except where expressly indicated, all numerical quantities seen the descriptions in claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "co-polymer," "ter-polymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

Figure 1:
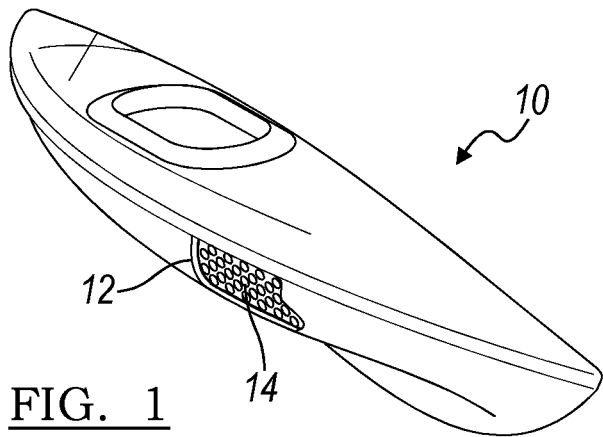
FIG. 1 schematically illustrates an isometric view of a water-going vessel according to at least one embodiment.

FIG. 1 schematically illustrates a water-going vessel 10, such as a sit-in kayak having a deck and a hull, a sit-on-top kayak or a one- or two-person watercraft. Water-going vessel 10 includes a wall 12 having a thermal bond to an in-situ foam core 14. In-situ foam core 14 is formed by fully expanding pre-expanded beads. The thermal bond includes a cooled joint formed from a molten and/or softened layer from wall 12 adjacent to a molten and/or softened layer of foam core 14, with an optional layer of intermingled portions of wall 12 layer and foam core 14 layer. It is understood that the optional layer may include a layer of distorted shape beads adjacent to the walls. It is understood that portions of other intermediate layers may be present in the thermal bond, such as a tie layer or a metal insert embedded in the article.

The steps of expanding the pre-expanded beads to fully expanded beads 42 are illustrated by U.S. patent application Ser. Nos. 13/358,181 and 13/005,190, and U.S. Publication No. 2012-0104110-A1, published May 3, 2012, all of which are incorporated herein by reference.

In at least one embodiment, wall 12 thickness may range from 0.02 inches to 0.5 inches. In another embodiment, wall 12 thickness may range from 0.125 inches to 0.25 inches.

In at least one embodiment, in-situ foam core 14 thickness may range from 0.15 inches to 6 inches. In another embodiment, in-situ foam core 14 thickness may range from 0.2 inches to 4 inches. In another embodiment, in-situ foam core 14 thickness may range from 0.5 inches to 1 inch.

Wall 12, in at least one embodiment, is formed of a composition of any moldable composition. Non-limiting examples of the composition include, but are not limited to, a liquid silicone rubber, a synthetic rubber, a natural rubber, a liquid crystal polymer, a synthetic polymer resin, and a natural polymer resin. In another embodiment, wall 12 is a formed of a composition of a thermoplastic polymer, a thermoset polymer, or blends thereof having a viscosity ranging from 0.1 grams/10 min to 40 grams/10 min. The viscosity is measured according to ASTM D-1238 at 190° C. with a 2.16 kg weight. In yet another embodiment, wall 12 is formed of a composition of a polyolefin, including polypropylene and polyethylene, having a viscosity ranging from 1 grams/10 min to 30 grams/10 min.

In-situ foam core 14 in at least one embodiment, is formed of a composition of any fluid-expandable material. Examples of fluid-expandable material include, but are not limited to, a polyolefin polymer composition, a biopolymer expandable bead, an alkenyl aromatic polymer or copolymer, a vinyl aromatic polymer resin composition, and a polystyrene polymer composition. In at least one embodiment, the polyolefin polymer composition includes polyolefin homopolymers, such as low-density, medium-density, and high-density polyethylenes, isotactic polypropylene, and polybutylene-1, and copolymers of ethylene or polypropylene with other polymerizable monomers, such as ethylene-propylene copolymer, ethylene-vinyl acetate copolymer, ethylene-acrylic acid copolymer, ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially and/or wholly pre-expanded without exceeding the scope or spirit of the contemplated embodiments.

Pre-expanded beads, in at least one embodiment, are the resultant bead after raw bead has undergone a first expansion step of a two-step expansion process for beads. During the first expansion step, raw bead is expanded to 2% to 95% of the fully expanded bead size. The fully expanded bead is the bead that forms in-situ foam core. In another embodiment, pre-expanded bead is result of the first expansion step where raw bead is expanded from 25% to 90% of the fully-expanded bead size.

A fluid for the second expansion step of the two-step expansion process for beads causes the pre-expanded beads to expand completely to form the fully expanded beads. Examples of the fluid include, but are not limited to, steam and superheated steam.

Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO® EPP, has no external wall.

In at least one embodiment, in-situ foam core 14 density, after expansion by steam, ranges from 1 lb/ft$^3$ to 25 lbs/ft$^3$. In at least one embodiment, in-situ foam core 14 density ranges from 1.5 lbs/ft$^3$ to 15 lbs/ft$^3$. In at least one embodiment, in-situ foam core 14 density ranges from 2 lbs/ft$^3$ to 9 lbs/ft$^3$. In at least one embodiment, in-situ foam core 14 density ranges from 3 lbs/ft$^3$ to 6 lbs/ft$^3$.

In at least one embodiment, wall 12 with a range of 0.025 inch thickness to 0.1 inch thickness is comprised of a metallocene polypropylene. Such a combination is found to improve adhesion between wall 12 and in-situ core from 14 formed of EPP.

It is understood that each article disclosed herein may be recyclable.

Figure 2:
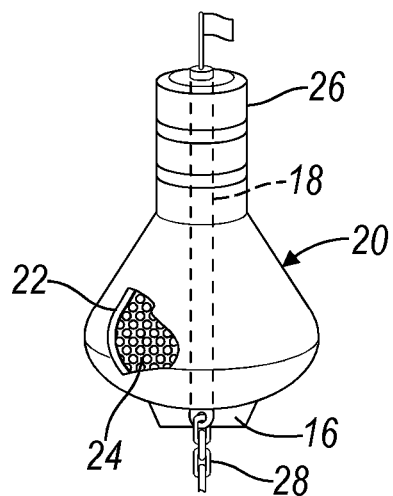
FIG. 2 schematically illustrates an isometric view of a buoy according to at least one embodiment.

Turning now to FIG. 2, a buoy 20 is schematically illustrated according to at least one embodiment. Buoy 20 includes a wall 22 and an in-situ foam core 24 having a thermal bond to wall 22 as schematically illustrated in a cut-away view. Buoy 20 optionally includes a light 26, an anchoring station 28, a molded-in-tube 18, and a ballast 16. If this buoy 20 should be struck by a vessel or debris puncturing wall 22, the lack of water uptake by in-situ foam core 24 means that the buoy 20 remains afloat. In-situ foam core 14 absorbs less than 1 weight percent water, in certain embodiments, correcting buoy deficiencies in previously made buoys. It is understood that each wall in each of the figures has the same range of embodiments as wall 12. It is further understood that each in-situ foam care in each of the figures has the same range of embodiments as in-situ foam core 14.

Figure 3:
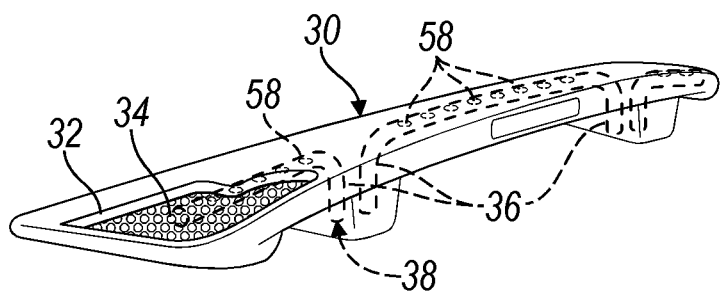
FIG. 3 schematically illustrates an isometric view of a spoiler for a vehicle according to at least one embodiment.

Turning now to FIG. 3, a spoiler 30 includes a wall 32 having a thermal bond to an in-situ foam core 34 according to at least one embodiment. Encapsulated by and helping to form in-situ foam core 34 is a tube 36 having a composition with sufficiently high melting temperature so as to resist melting in the steam and/or superheated steam. A non-limiting example of the composition is a polyamide composition.

Steam and superheated steam, in certain embodiments, especially those with show surfaces on all exterior surfaces, such as the spoiler, is injected into the spoiler 30 through an inlet of tube 36, which functions as a manifold and has a plurality of apertures 58 allowing steam or superheated steam into in-situ foam core 34 to cause the pre-expanded beads to fully expand forming foam core 34. Inlet 38, in certain embodiments, is suitable as a retention device for a fastener.

Figure 4:
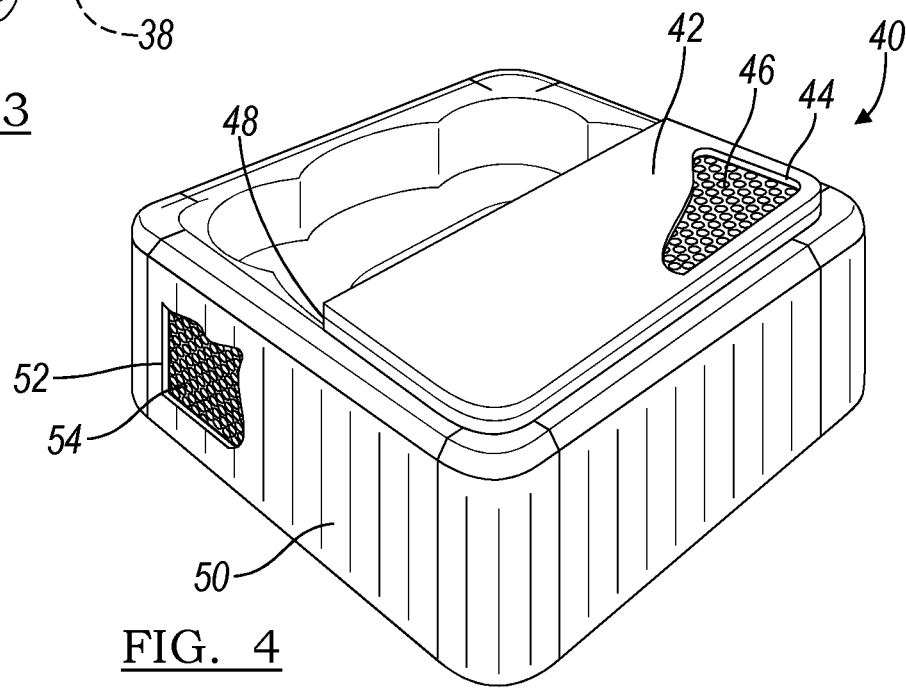
FIG. 4 schematically illustrates an isometric view of a hot tub system according to at least one embodiment.

Turning now to FIG. 4, a hot tub system 40 is schematically illustrated according to at least one embodiment. Hot tub system 40 includes a top 42 including a wall 44 having a thermal bond to an in-situ foam core 46. Top 42 further includes a living hinge 48. Panel 50 supporting top 42 includes wall 52 having a thermal bond to an in-situ foam core 54. Top 42 is particularly desirable because of its initially lower weight relative to current systems, and its lack of absorption of water, which is limited to less than one weight percent of water in certain embodiments. In another embodiment, in-situ foam cores 46 and/or 54 absorb less than 0.5 wt. % water. It is understood that while a hot tub system 40 is illustrated, other water containing articles, such as but not limited to, a spa, shower, a bathtub and an interior insert 56 to the hot tub system 40 are contemplated.

Figure 5:
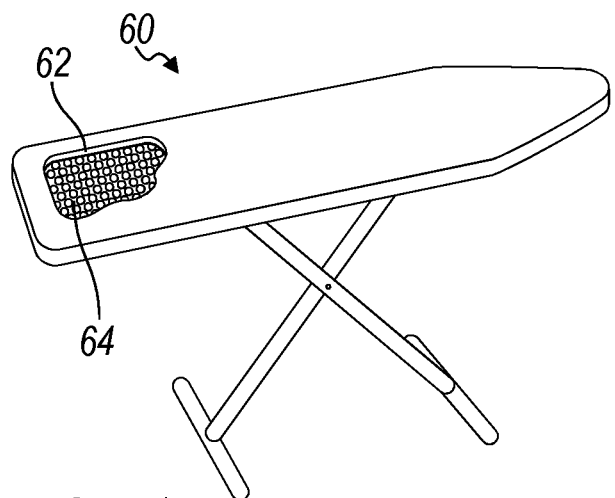
FIG. 5 schematically illustrates an isometric view of an ironing board according to at least one embodiment.

Turning now to FIG. 5, an ironing board 60 is schematically illustrated according to at least one embodiment. Ironing board 60 includes wall 62 having a thermal bond to an in-situ foam core 64.

Figure 6:
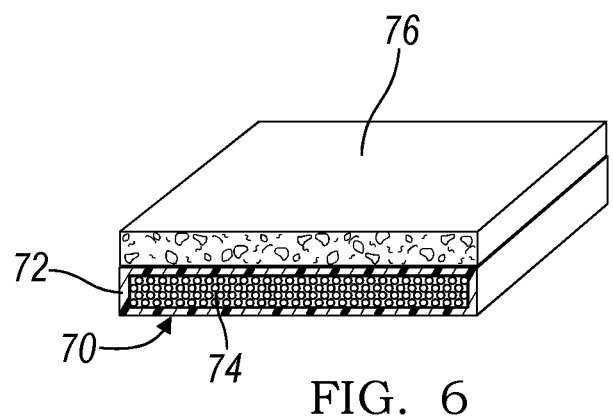
FIG. 6 schematically illustrates an isometric cross-sectional view of a precast floor support according to at least one embodiment.

Turning now to FIG. 6, a precast floor support 70 includes a wall 72 and an in-situ foam core 74 having a thermal bond to wall 72. During construction of many buildings, recently, precast floor support 70 would receive a layer of light weight concrete 76 to form a floor, such as a mezzanine floor. Precast floor support 70, in at least one embodiment, exhibits creep of 0.5% to 3.5% when measured at 1000 hr according to ASTM D-3575 when in-situ foam core 74 density ranges from 1.0 to 5.0 lbs/ft$^3$.

In at least one embodiment, preexpanded comprise homopolymer composition pre expanded beads, in order to increase the stiffness of in-situ foam core 74. As a non-limiting example, when the homopolymer beads are a homopolymer polypropylene, the stiffness increases such that a 100,000 lb load yields a 5.8% strain and a compression of only 0.007 inches. In another example, the strain ranges from 2% strain to 10% strain.

In at least one embodiment, precast floor support 70 yields surprising savings because it is such a good thermal insulator that the users no longer need to add additional layers of insulation for energy usage reduction. In at least one embodiment, precast floor support 70 has a u-value of less than 0.17. In another embodiment, precast floor support 70 has a u-value of less than 0.145.

Figure 7:
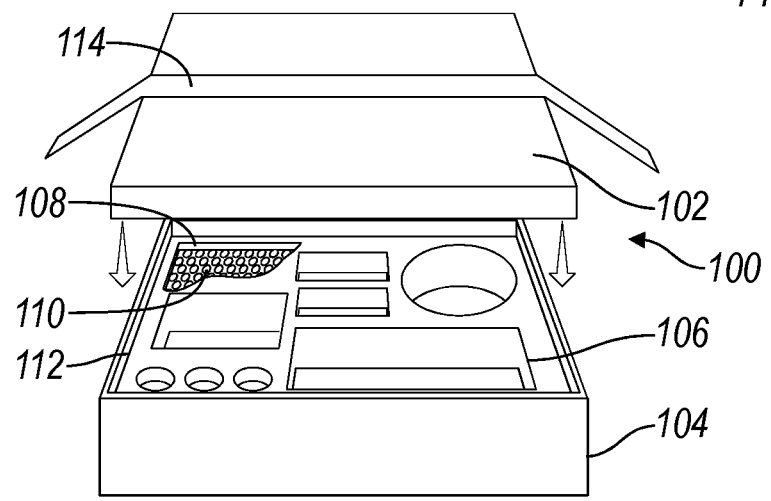
FIG. 7 schematically illustrates an isometric view of a class IX shipping container according to at least one embodiment.

Turning now to FIG. 7, an International Air Transport Association (IATA) class IX shipping container 100 is schematically illustrated according to at least one embodiment. Class IX shipping container 100 includes a top 102 and a bottom 104. Bottom 104 has a plurality of embossments 106 formed with a wall 108 having a thermal bond to an in-situ foam core 110 to wall 108 as illustrated in the cut-away section. At least one of top 102 and bottom 104 includes a sealing gasket 112. Optionally, one or more securing bands 114 may be applied to further secure top 102 to bottom 104.

In at least one embodiment, in-situ foam core 110 and/or wall 108 comprises a non-conductive divider. In at least one embodiment, the non-conductive divider surface resistance maximum is greater than $10^{12}$ ohm per square; where surface resistance is the inverse measure of conductivity when measured to standard ANSI/ESD-S 20.20-1999. In another embodiment, in-situ foam core 110 and/or wall 108 prevent electrostatic discharge. In at least one embodiment class IX shipping container 100 is suitable for airborne cartage of primary non-rechargeable batteries, such as lithium metal batteries, and/or rechargeable batteries, such as lithium ion batteries. It should be understood that in at least one embodiment, in-situ foam core 110 and wall 108 comprise an IATA Class VIII shipping container suitable for corrosive materials.

Figure 8:
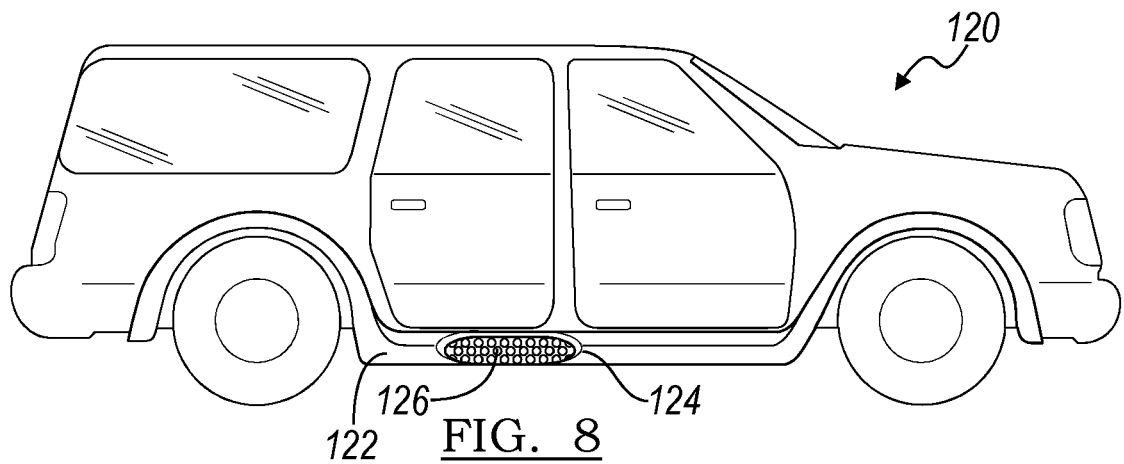
FIG. 8 schematically illustrates an isometric view of a running the board for use with a vehicle according to at least one embodiment.

Turning now to FIG. 8, a running board 122 is schematically illustrated according to at least one embodiment as attached to a vehicle 120. Running board 122 includes wall 124 having a thermal bond to an in-situ foam core 126. Running board 122 reduces the weight of a vehicle running board by at least 30% relative to current running boards, while retaining structural strength. It is understood that while a van vehicle is illustrated, running board 122 may be used for a passenger truck, a class 6-8 tractor cab, a mower, a mining vehicle, and other suitable vehicles where the first step is at least 6" or more above the ground. It is also understood that while running board 122 is illustrated as fixed, a retractable and/or deployable running board or vehicle step is contemplated. Further, it should be understood that running board 122 may comprise a ramp system for a van accessible vehicle for use by handicapped people.

Figure 9:
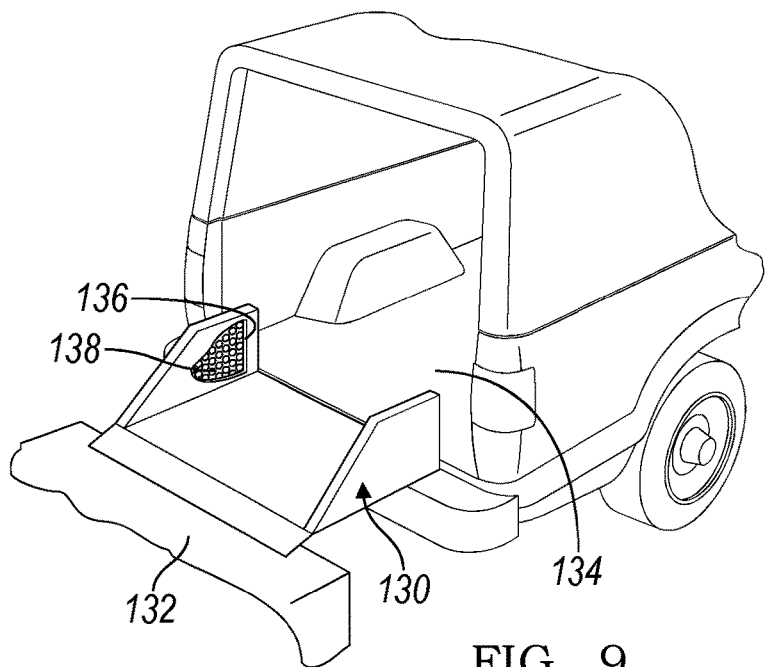
FIG. 9 schematically illustrates an isometric view of a ramp of for use in loading a vehicle according to at least one embodiment.

Turning now to FIG. 9, a ramp 130 is schematically illustrated according to at least one embodiment. Ramp 130 permits wheeled carts to traverse a gap between a loading dock 132 and a vehicle 134. Ramp 130 includes a wall 136 having a thermal bond to an in-situ foam core 138. Ramp 130 reduces the weight by at least 25 pounds relative to current metal and/or wood ramps, which makes it more ergonomically desirable for vehicle drivers who must position the ramp at each stop.

Figure 10:
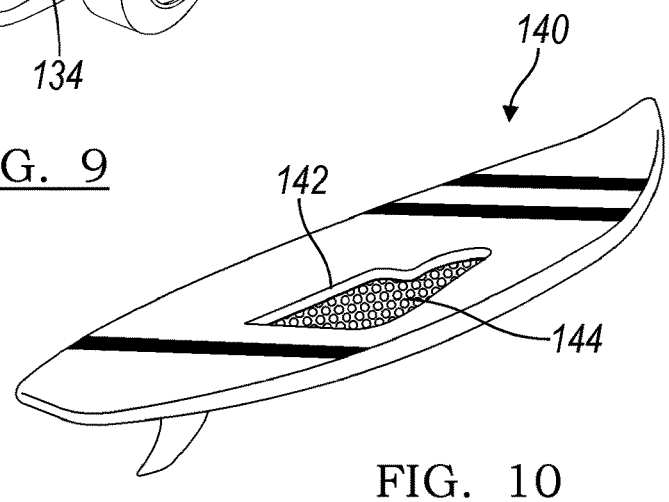
FIG. 10 schematically illustrates an isometric view of a surfboard according to at least one embodiment.

Turning now to FIG. 10, a surfboard 140 is schematically illustrated according to at least one embodiment. Surfboard 110 includes wall 142 having a thermal bond to in-situ foam core 144. It should be understood that while surfboard 140 is illustrated, is exemplary of other similar boards, such as a sail board, a small sailboat, and a skateboard deck.

Figure 11:
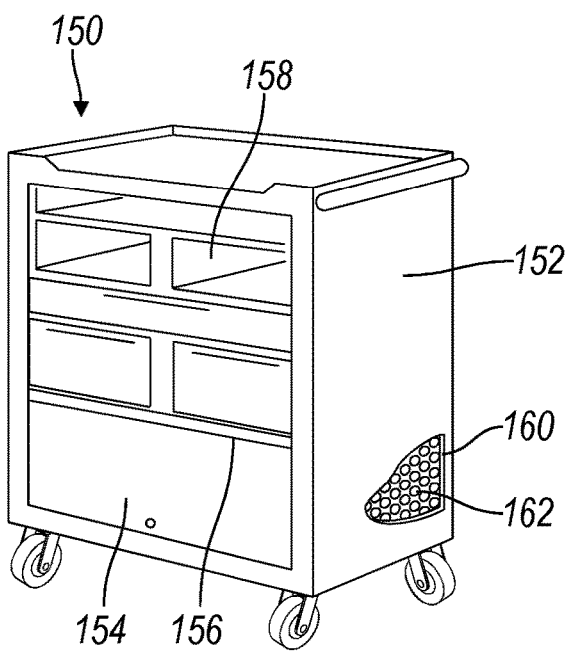
FIG. 11 schematically illustrates an isometric view of a roll-around cart according to at least one embodiment.

Turning now to FIG. 11, a roll-around cart 150 is illustrated according to at least one embodiment. Roll around cart 150 includes a panel 152, an optional embossment 158, and an optional lockable door 154. Lockable door 154 includes a living hinge 156. Panel 152 includes wall 160 having a thermal bond to an in-situ foam core 162.

Figure 12:
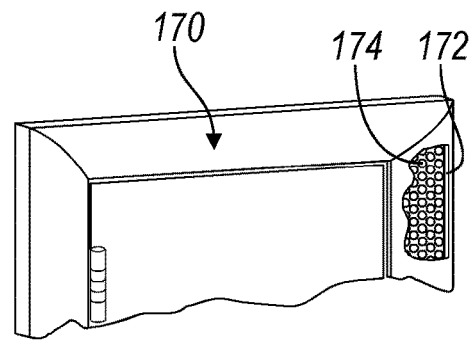
FIG. 12 schematically illustrates an isometric view of a moulding for use with a building according to at least one embodiment.

Turning now to FIG. 12, a moulding 170, such as a doorjamb or a window frame is schematically illustrated according to at least one embodiment. Molding 170 includes a wall 172 having a thermal bond to an in-situ foam core 174. Moulding 170 is significantly more stable in terms of thermal expansion and construction than current PVC frames. Moulding 170 has a thermal expansion coefficient less than $5 \times 10^{-6}$ in/in/° F.

Turning now to FIGS. 13A-13C, highway bumper systems, such as, but not limited to, plastic structural articles including a highway guard rail end terminal 180, a jersey wall 186, and a V-shaped barrier 192, are schematically illustrated in an isometric view according to at least one embodiment. In FIG. 13A, highway guard rail end terminal 180 is an impact attenuator and includes a wall 182 having a thermal bond to an in-situ foam core 184. In at least one embodiment, the end terminal 180 may have a plurality of slots arranged in a staggered or an offset pattern of slots 198 with bolts 208 mounted to a guard rail 212 having a support 214 to ground providing a sliding resistive force sufficient to stop a 70 mph vehicle in less than 10 seconds. The foam core energy absorption capacity and foam core damping response surprisingly, in at least embodiment, with slots 198 creates an essentially square wave of energy absorption. In at least one embodiment, the highway bumper system ultimately compresses less than 25% when struck at 70 mph by a 3000 lb. vehicle.

In at least one embodiment, highway bumper system includes a energy absorbing bumper 216 disposed between guard rail 212 and support 214. Bumper 216 includes a wall 218 having a thermal bond 242 to an in-situ foam core 244

In FIG. 13B, V-shaped barrier 192, in at least one embodiment, is disposed on ground, and includes a wall 194 having a thermal bond to an in-situ foam core 194. The V-shaped barrier 192 is a device for absorbing the energy of a vehicle and protecting the same in the event of a collision with a relatively immovable hazard along a highway such as a bridge abutment. It is understood that while the V-shaped barrier 192 is illustrated, other shapes such as a torroid, may be used in other embodiments without exceeding the scope or spirit of the embodiments. In addition, it is also understood that the V-shaped barrier 192 may be combined with other energy absorbing components such as flexible annular rings, for a non-limiting example, a plurality of tires, without exceeding the scope and spirit of the embodiments.

In FIG. 13C jersey wall 186, in at least one embodiment, includes a wall 188 having a thermal bond to an in-situ foam core 188. In another embodiment, jersey wall 186 may include a connector 206, such as J-J hook or U-channel embedded in at least one end in order to facilitate joining multiple jersey walls together to form a barrier wall. In at least embodiment, the foam core 188 provides jersey wall 186 with sufficient structural mechanical strength and energy damping to pass NCHRP-350 Level TL-2 and TL-3, as well as European Containment Level Test with a test rating of H2, and a European Containment rating at levels T1, T2, and T3. It is understood that while a jersey barrier-type shape is illustrated, other shapes, such as an F-shape and a Constant Slope shape, are contemplated within the scope and spirit of the invention. Jersey wall 186 is significantly lighter than conventional precast concrete barriers reducing the amount of labor and capital equipment necessary to install the barrier. In at least one embodiment, jersey wall 186 is sufficiently portable that it can be used to protect workers on the roadway and provide a warning function, such during nighttime closures, and then be economically removed by a 2×4 wheel drive pickup truck on a daily basis, such as at the end of the work shift, effectively replacing the highway orange barrels currently used. The highway orange barrels provide the warning function to drivers, but do not significantly inhibit drivers from entering the work zone, thereby possibly endangering workers on the roadway.

Turning now to FIG. 14, a playground equipment component, such as a playground slide 200 is schematically illustrated in an isometric perspective view according to at least one embodiment. Playground slide 200 includes a wall 202 having a thermal bond to an in-situ foam core 204. Playground slide 200 is another embodiment of a plastic structural article. It is understood that while a playground slide 200 is illustrated, other typical structural playground articles, such as, but not limited to, a teeter-totter and components of playground equipment, especially tubular, rectangular, or square cross-sectional components having spans in excess of 2 meters with cross-section maximum dimensions of 10 mm or suitable sizes for young children's hands are contemplated with the scope and spirit of the embodiments of the invention.

Turning now to FIG. 15, a storage shed 220 is schematically illustrated in an isometric view according to at least one embodiment. Storage shed 220 includes components such as a roof panel 222 having a wall 224 having a thermal bond to an in-situ foam core 226. Storage shed 220, in certain embodiments, has roof panel 222 with a minimum flat dimension exceeding 3 feet, where 3-foot span is the standard maximum for conventionally constructed shed roof panels. In another embodiment, storage shed 220 roof panel 222 has a minimum flat dimension equal to or exceeding 4 feet. In another embodiment, the storage shed 220 roof panel 222 has a minimum area of 4 foot by 8 foot, that when in clear span width, has a maximum sag of 0.75" relative to the horizontal plane of the panel. In yet another embodiment, the storage shed 220 roof panel 222 has a minimum area of 4 foot by 8 foot, that when in clear span width, has a maximum sag of 0.25" relative to the horizontal plane of the panel. In yet another embodiment, the storage shed 220 roof panel 222 has a minimum area of 4 foot by 8 foot, that when in clear span width, has a maximum sag of 0.35" relative to the horizontal plane of the panel when tested at 90° C.

In at least one embodiment, storage shed 220 has a segmented door 228 and roof panel 222 and is certified to resist hurricane force winds in excess of a design pressure rating exceeding DP30. In another embodiment, storage shed 220 has a double door 228 and roof panel 222 and is certified to resist hurricane force winds in excess of a design pressure rating exceeding DP40. In yet another embodiment, storage shed 220 has a door 228 and roof panel 222 and is certified to resist hurricane force winds in excess of a design pressure rating of DP50. In at least one embodiment, segmented door 228 includes a plurality of profiles 230 having a wall 232 and an in-situ foam core 234 having a thermal bond 236 bonding wall 232 and in-situ foam core 234.

In at least one embodiment, storage shed 220 in anchored by a footer 250 of a cementious composition which encapsulates a base 254 which interlocks with a wall panel 252 of storage shed 220. Wall panel 252 includes a hook attachment 256 rolls into lock with a retention member 258 of base 254.

FIGS. 16A-16E schematically illustrate a method of producing a plastic structural article having an in-situ foam core according to at least one embodiment. Regarding FIG. 16A, has a nozzle 312 containing a molten polymer composition 314. Molten polymer composition 314 is injection molded into a mold 316 having a first mold portion 318 and a second mold portion 320. The first and second mold portions 318 and 320, respectively, define a cavity 322 within the mold 316 into which molten polymer composition 314 is being injected through at least one sprue 324.

Figure 16A:
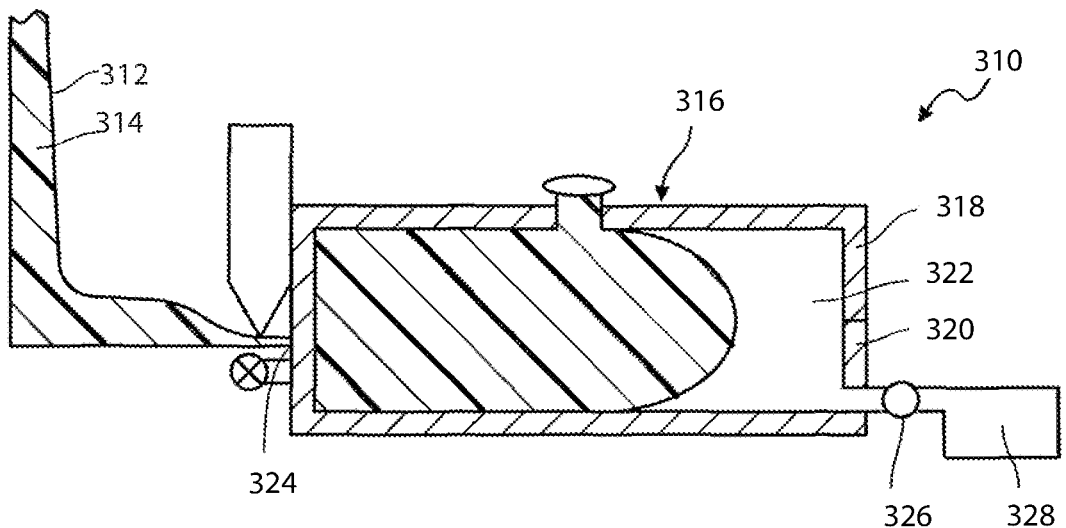
FIG. 16A-16E schematically illustrates a method of producing an article having an in-situ foam core according to at least one embodiment.
Figure 16B:
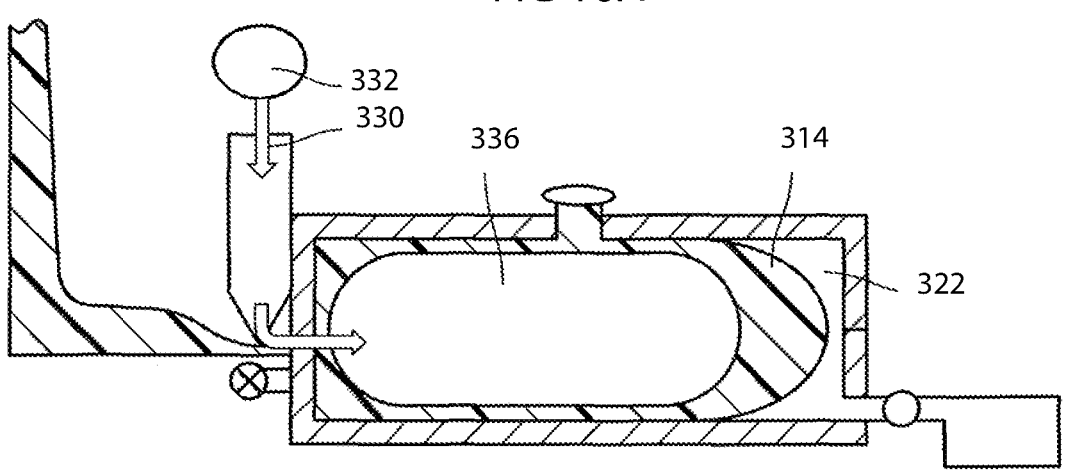

FIG. 16B includes having a fluid 330 from a fluid source 332 enter mold cavity 310 which is now, at least, partially filled with molten polymer 314 by pushing molten polymer 314 towards the walls of mold 316. When molten polymer 314 is pushed completely to the wall of mold 316 by the fluid 330 in FIG. 16C, a cavity 336 is formed inside the injection molding shot of molten polymer 314 and excess molten polymer 314 is displaced into a spillover trap 328 through valves 26 (FIG. 16A). Fluid 330 cools molten polymers 14 sufficiently such that a hollow article 346 is self-supporting. Fluid 330 is removed from cavity 336 through a vent 334. Vent 334 is subsequently closed.

Figure 16C:
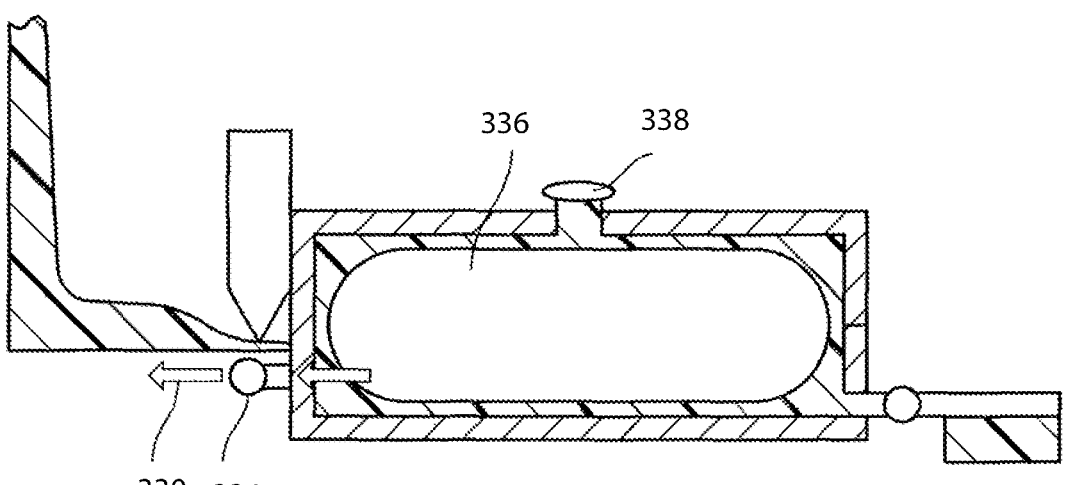

The steps of FIGS. 16A-C are illustrated by U.S. Pat. No. 6,375,892 which is incorporated herein by reference.

Figure 16D:
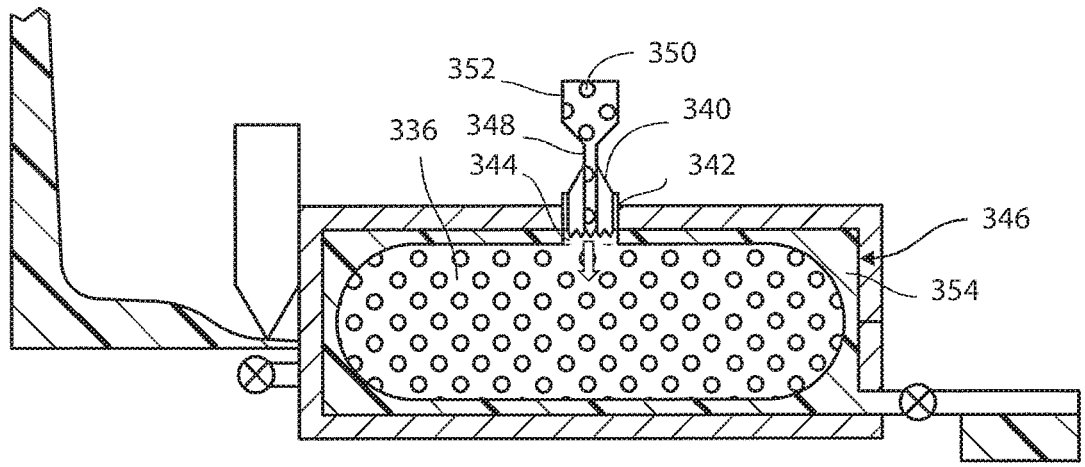

FIG. 16D has a port cap 338 (FIG. 16C) removed and includes a rotary cutter 340 that passes through a mold port 342 cutting an aperture 344 in a wall 354 of the hollow article 346. Rotary cutter 340 withdraws from aperture 344 and a bead dispenser 348 enters aperture 344. Valve 326 is closed.

In FIG. 16D, pre-expanded beads 350 are dispensed from a bead source 352 to bead dispenser 348 and from bead dispenser 348 into cavity 336 of hollow article 346. Bead dispenser 348 withdraws from aperture 344. It is understood that pre-expanded beads 350 may be compressed during dispensing.

Figure 16E:
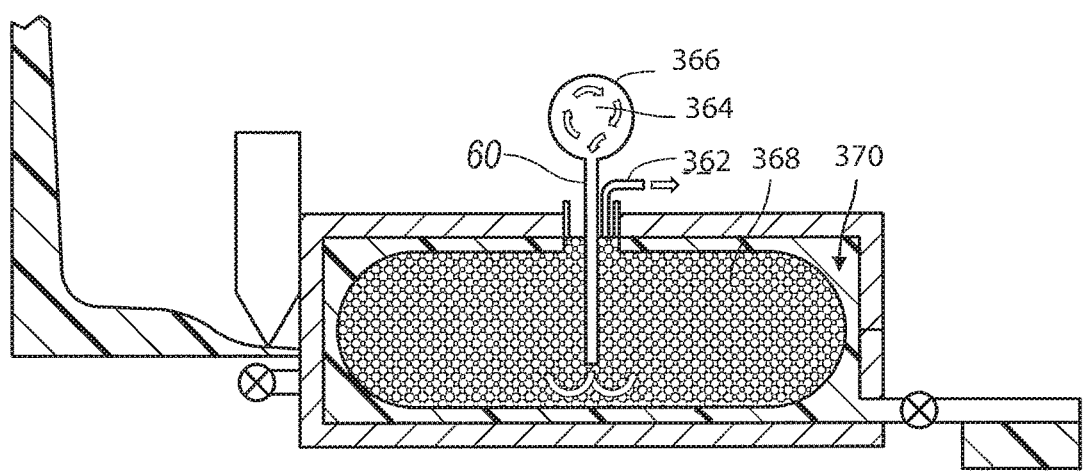

In FIG. 16E, a steam pin 360 and a steam vent 362 are inserted into aperture 344. Steam 364 from steam source 366 is injected into cavity 336 causing rapid expansion of pre-expanded beads 350 which tightly pack cavity 336 forming an in-situ foam core 368 having a thermal bond to wall 354. A plastic structural article 370 having a skin 372 formed of a cooled polymer and in-situ foam core 368 is released from mold 316 by separating the first mold portion 318 from the second mold portion 320.

The steps of FIGS. 16D-E are illustrated by U.S. patent application Ser. Nos. 13/358,181, 13/005,190, and 12/913,132 all of which are incorporated herein by reference.

Figure 17A:
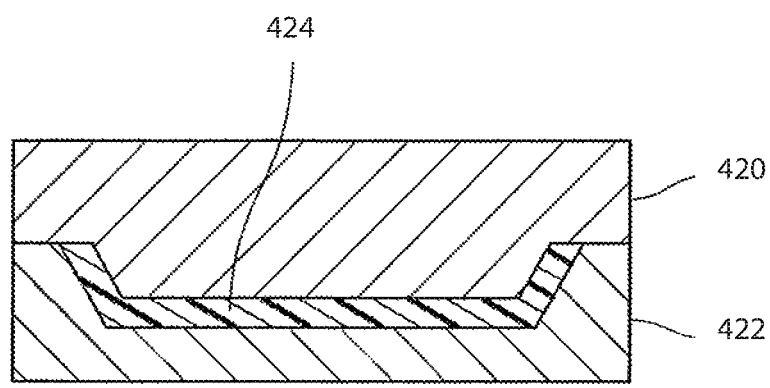
FIG. 17A-17E schematically illustrates a method of producing an article having an in-situ foam core according to at least one other embodiment.

Turning now to FIG. 17A, an injection-molded part 424 is formed between a first mold portion 420 and a second mold portion 422 by any injection-molding method known in the art.

Figure 17B:
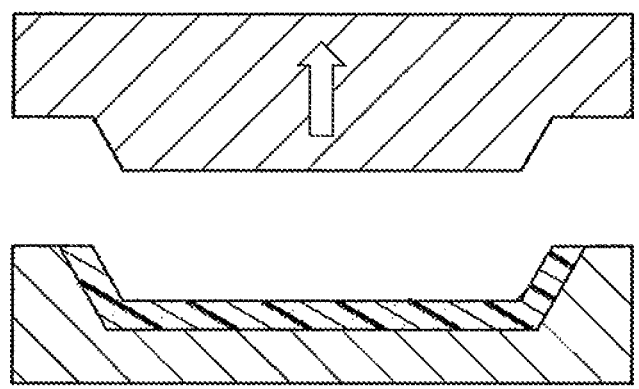
Figure 17C:
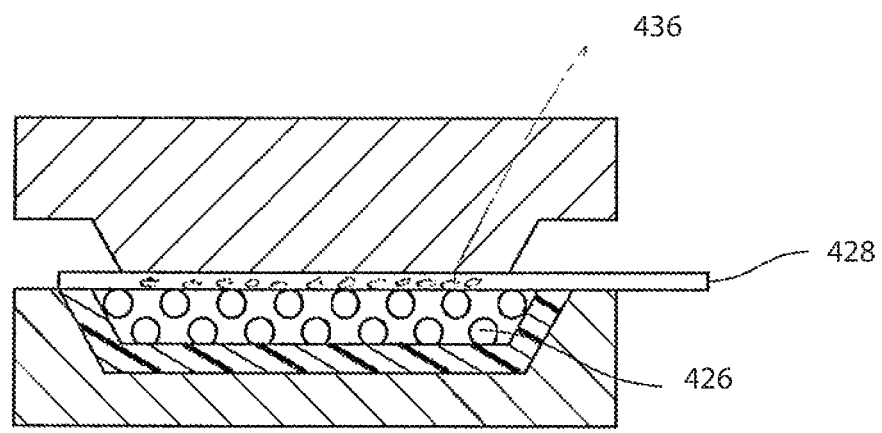

In FIG. 17B, first mold portion 420 is raised to allow insertion of pre-expanded beads 426 and a tube 428, as shown in FIG. 17C. Tube 428 is comprised of a material having a sufficiently high melting point that tube 428 will not melt when exposed to steam or superheated steam. Tube 428 has small apertures capable of permitting steam or superheated steam to infiltrate pre-expanded beads 426.

Figure 17D:
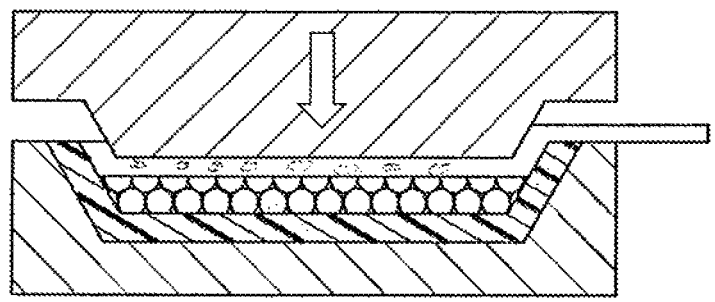
Figure 17E:
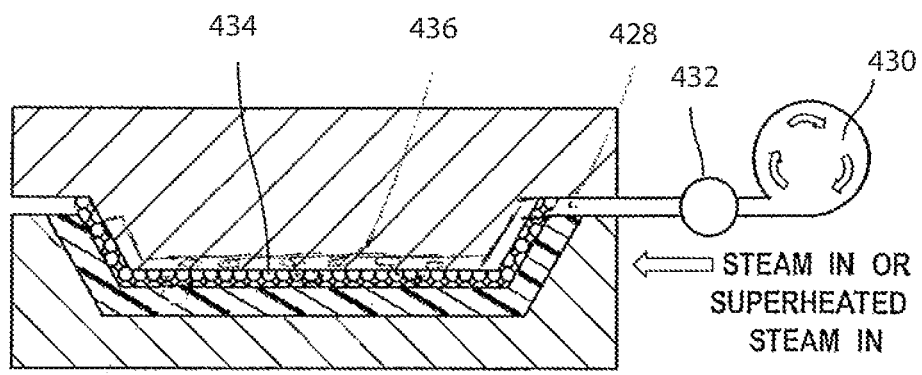

In FIG. 17D, first mold portion 420 is closed, thereby compressing pre-expanded beads 426 and tube 428. In FIG. 17E, steam or superheated steam from steam source 430 passes through valve 432 which is connected to tube 428. Steam interacts with the pre-expanded beads 426, thereby expanding pre-expanded beads 426 to fully expanded beads forming in-situ foam core 434. In-in situ foam core 434 is thermally bonded to injection-molded part 424. Injection-molded part 424 and in-situ foam core 434 comprise a structural plastic article, which can be removed from between first mold portion 420 and second mold portion 422 when at least one of the mold portions separates from the other.

The heating mechanism, such as steam 464, is supplied in FIGS. 16E and 4E from steam source 466, in at least one embodiment. Steam 464 is directed to a plurality of steam ports, such as steam pin 460. When there is a plurality of steam pins 460, spacing between steam pins 460 may vary with the density of unexpanded beads because the steam migration is limited. In at least one embodiment, the spacing between adjacent steam pins 460 ranges from 1 inch to 6 inches. In another embodiment, the spacing between adjacent steam pins 460 ranges from 2 inches to 5 inches. In yet another embodiment, the spacing between adjacent steam pins 460 ranges between the distances defined by equations [1] and [2]

$$D_1 = \frac{1}{ABD \times 0.56} - 0.5 \quad [1]$$

$$D_2 = \frac{1}{ABD \times 5} + 3 \quad [2]$$

wherein $D_1$ is the minimum distance in inches between steam pins 460 and $D_2$ is the maximum distance in inches between steam pins 460, ABD is an average apparent bulk density of unexpanded and/or partially expanded polymer particles suitable for comprising in-situ foam core 468.

In at least one embodiment, the average apparent bulk density of the pre-expanded beads 450 ranges from 0.15 lbs/ft$^3$ to 4 lbs/ft$^3$. In another embodiment, the average apparent bulk density of the pre-expanded beads 450 ranges from 0.2 lbs/ft$^3$ to 2 lbs/ft$^3$.

In at least one embodiment, steam pin 460 may include a plurality of apertures along the steam pin 460 shaft, thereby distributing steam 464 at a plurality of locations along the shaft. In another embodiment, steam pin 460 may include a plurality of concentric shafts capable of telescoping out in and retracting in, thereby distributing steam 464 at a plurality of locations along the path of the shafts. In yet another embodiment, steam pin 460 includes a plurality concentric shafts, as above, with each shaft section having a plurality of apertures along the shaft section.

In FIG. 18A, blow mold sections 540 and 542 define a blow mold cavity 544 into which a molten polyolefin parisonn 546 is extruded from an extruder 548. Parison 546 defines an internal parison cavity 550.

In FIG. 18B, blow mold sections 540 and 542 close upon parison 546. Gas 560 is injected into parison cavity 550 inflating the hot parison 546 while still soft and deformable to conform to the walls of the blow mold cavity 544 defining a shell 565 having a cavity 564 which may be larger than the original parison cavity 550.

In FIG. 18C, feed apertures 570, 572, and 574 are cut through shell 562. Staged filling begins as unexpanded EPP beads 568 are introduced to cavity 564 through an EPP introduction device fitted to blow mold section 542. At a first stage, EPP beads 568 are introduced through feed aperture 570. When the cavity 564 is substantially filled to the height of feed aperture 570, a second stage introduces unexpanded EPP beads 568 through aperture 572 until that portion of cavity 564 is substantially filled. A third stage introduces unexpanded EPP beads 568 through aperture 574 until the cavity 564 is filled.

EPP introduction device (not shown) is withdrawn from apertures 570, 572, and 574. The apertures 570, 572, and 574 are plugged. Steam injection needles 576, 278, 580, 582 are inserted through blow mold section 542 and shell 562 into the filled cavity 564.

In FIG. 18D, steam is injected through steam injection needles 576, 578, 580, 582 into unexpanded beads 568 causing the beads to expand forming a core 590 in the area that was previously cavity 564, and bonded to the shell 562 with the thermal bond.

It should be understood that other embodiments may use a heating medium other than steam without exceeding the scope of contemplated embodiments. It is further understood that the expanded polyolefin may be formed using a heating medium in cooperation with a blowing agent, such as pentane.

Figure 19:
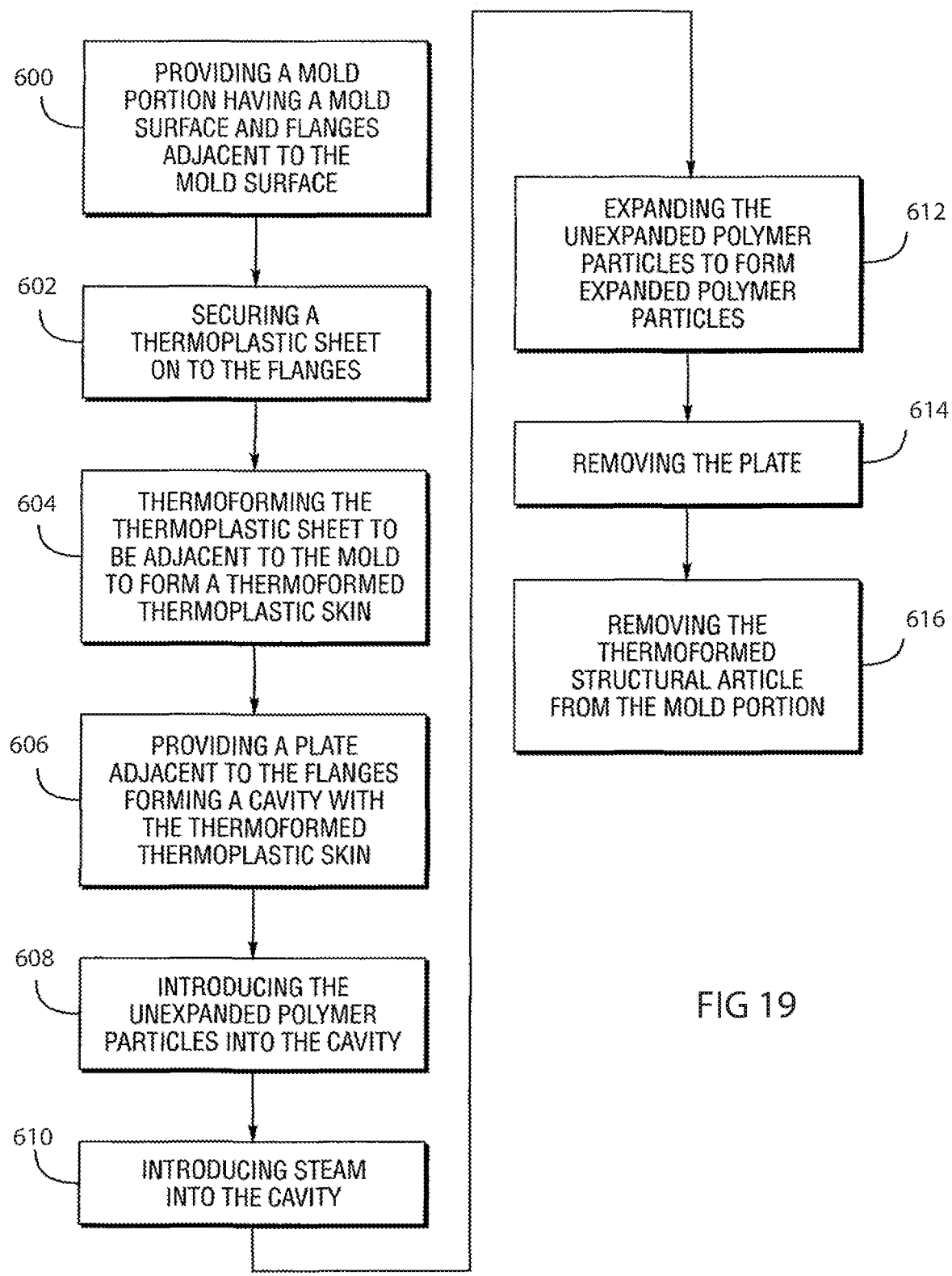
FIG. 19 diagrammatically illustrates a method of producing an article having an in-situ foam core according to another embodiment.

At least one embodiment illustrated in FIG. 19, in step 600 a method for manufacture of an article having one plastic layer includes providing a mold portion having a mold surface and flanges adjacent to the mold surface. A plastic sheet having a thermoplastic composition is secured to the flanges in step 602. In step 604 the thermoplastic sheet is thermoformed to be adjacent to the mold surface to form a thermoformed thermoplastic skin. A plate is situated adjacent to the flanges forming a cavity with the thermoformed thermoplastic skin in step 606. In step 608, unexpanded and/or pre-expanded polymer particles are introduced into the cavity when the pressure in the cavity is at least 30 pounds per square inch less than the pressure exerted on the unexpanded and/or pre-expanded polymer particles. During introduction, the unexpanded and/or pre-expanded particles are compressed by more than 10 vol %. The unexpanded and/or pre-expanded particles, in certain embodiments, rebound in size by at least 5 vol. % to approximately their original volume before introduction. In certain embodiments the particles may rebound to exceed their original volume. In step 610, steam is introduced into the cavity causing the unexpanded polymer particles to expand to form expanded polymer particles in step 612. Once the particles have substantially stopped expanding, the plate is removed in step 614. In step 616, the thermoformed structural plastic article is removed from the mold portion. The structural plastic article includes a plastic layer bonded to expanded polymer particles. The bonding occurs during the steps 610 through 612 when the polymer particles are expanding using steam to form an in-situ core with the plastic layer.

Figure 20:
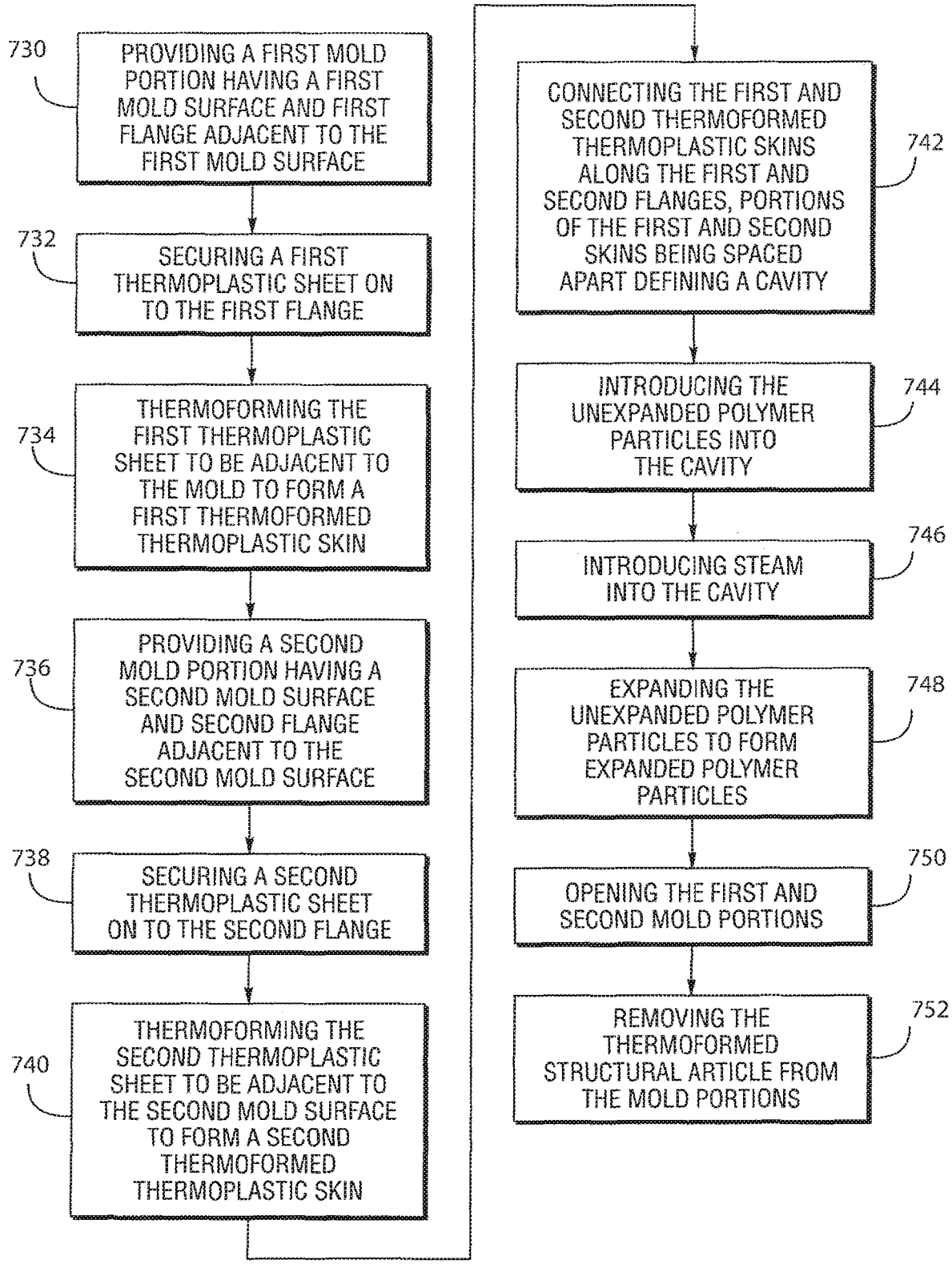
FIG. 20 diagrammatically illustrates a method of producing an article having an in-situ foam core according to another embodiment.

Referring now to FIG. 20, a method is recited for forming an article using twin sheet thermoforming skins with the expanding foam core. In step 730 a first mold portion having a first mold surface and first flanges adjacent to first mold surface is provided. In step 732, a first thermoplastic sheet is secured to the first flange. In step 734, the first thermoplastic sheet is thermoformed adjacent to the mold to form the first thermoformed thermoplastic skin.

In step 736, a second mold portion having a second mold surface and second flange adjacent to the second mold surface is provided. In step 738, a second thermoplastic sheet is secured on to the second flange. In step 740, the second thermoplastic sheet is thermoformed to be adjacent to the second mold surface to form a second thermoformed thermoplastic skin.

The first and second thermoformed thermoplastic skins are connected along the first and second flange in step 742, closing the mold. Portions of the first and second skins are spaced apart defining a cavity. In step 744, unexpanded polymer particles are introduced into the cavity. In step 746, steam is introduced into the cavity. The unexpanded polymer particles expand to form expanded polymer particles in step 748. After the polymer particles cease substantially to expand, the first and second mold portions are opened. In step 752, the thermoformed structural plastic article is removed from the mold portions.

It is understood that unexpanded polymer particles may include partially expanded polymer particles. It is also understood that the polymer particles may cease substantially to expand when the pressure in the mold in certain embodiments is 0.5 lbf/in² or less. In other embodiments, the pressure in the mold when the polymer particles may cease to expand substantially may range from 0.1 lbf/in² to 1 lbf/in².

Figure 21:
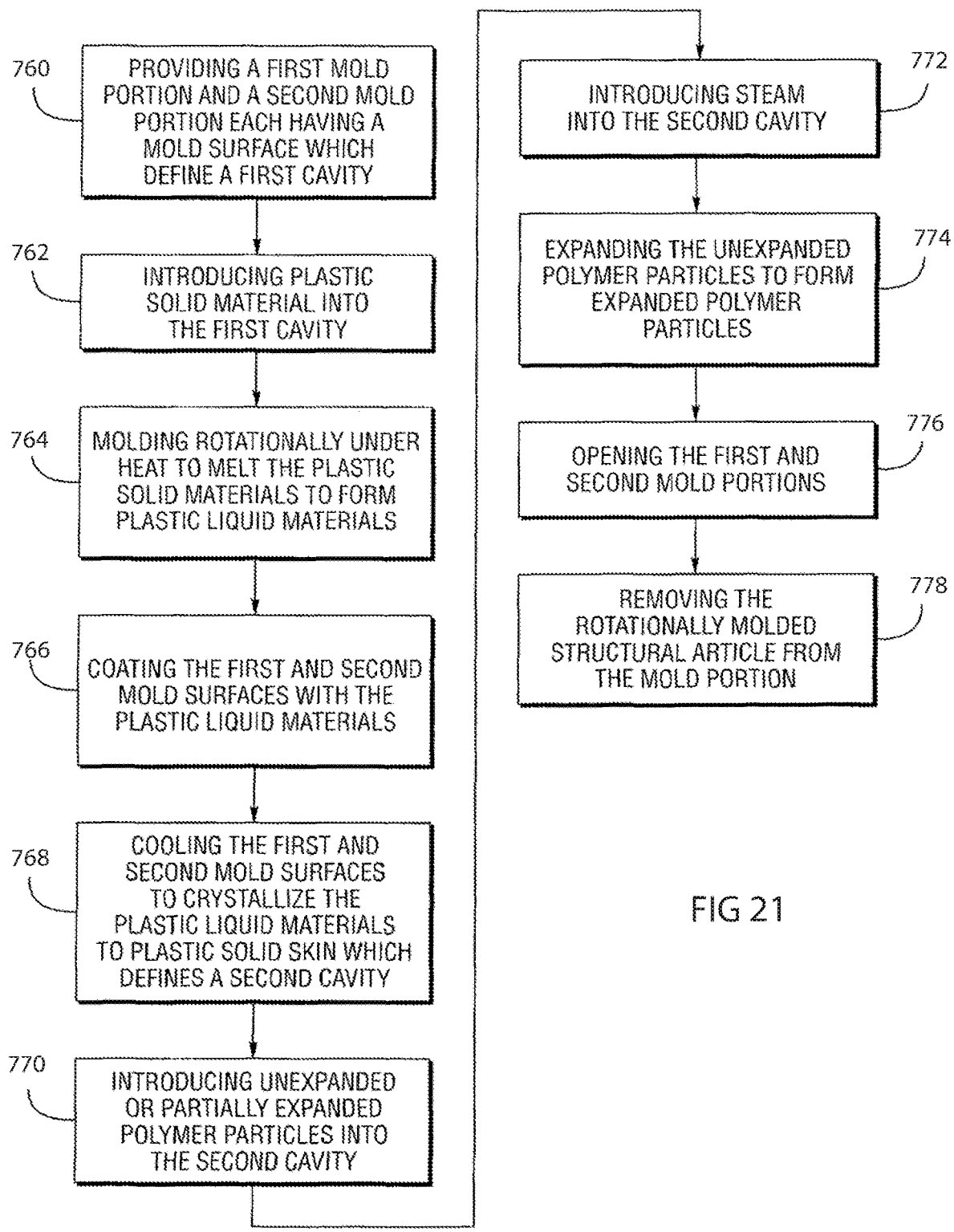
FIG. 21 schematically illustrates a method of producing an article having an in-situ foam core according to another embodiment.

In FIG. 21, another embodiment of a method of manufacture of the structural plastic articles is disclosed. In step 760, a first mold portion and a second mold portion each having a mold surface are provided. The two mold surfaces define a first cavity. In step 762, a plastic solid material is introduced into the first cavity. In step 764, the plastic solid material is molded rotationally under heat to melt the plastic solid to form plastic liquid materials. In step 766, the liquid plastic materials coat the first and second mold surfaces. In step 768, the first and second mold surfaces are cooled to crystallize the plastic liquid materials to plastic solid skin which defines a second cavity. In step 770, unexpanded or partially expanded polymer particles are introduced into the second cavity. In step 772, steam is introduced into the second cavity. In step 774, the unexpanded polymer particles are expanded by the steam to form expanded polymer particles. When the expansion of the polymer particles has substantially ceased, the first and second mold portions are opened in step 776. In step 778, the rotationally molded structural plastic article is removed from the mold portion. It should be understood, that curable plastic materials may be introduced in step 762 as a substitute for the plastic solid materials without exceeding the scope or spirit of the embodiment. It is also understood, that some liquid materials in certain embodiments, will require little or no heat beyond the ambient room temperature to begin curing the plastic liquid materials to crystallize or otherwise solidify the plastic liquid material in step 768. It is also understood that rotationally molding the structural plastic article may use processes such as rotational molding or rotocasting.

Figure 22:
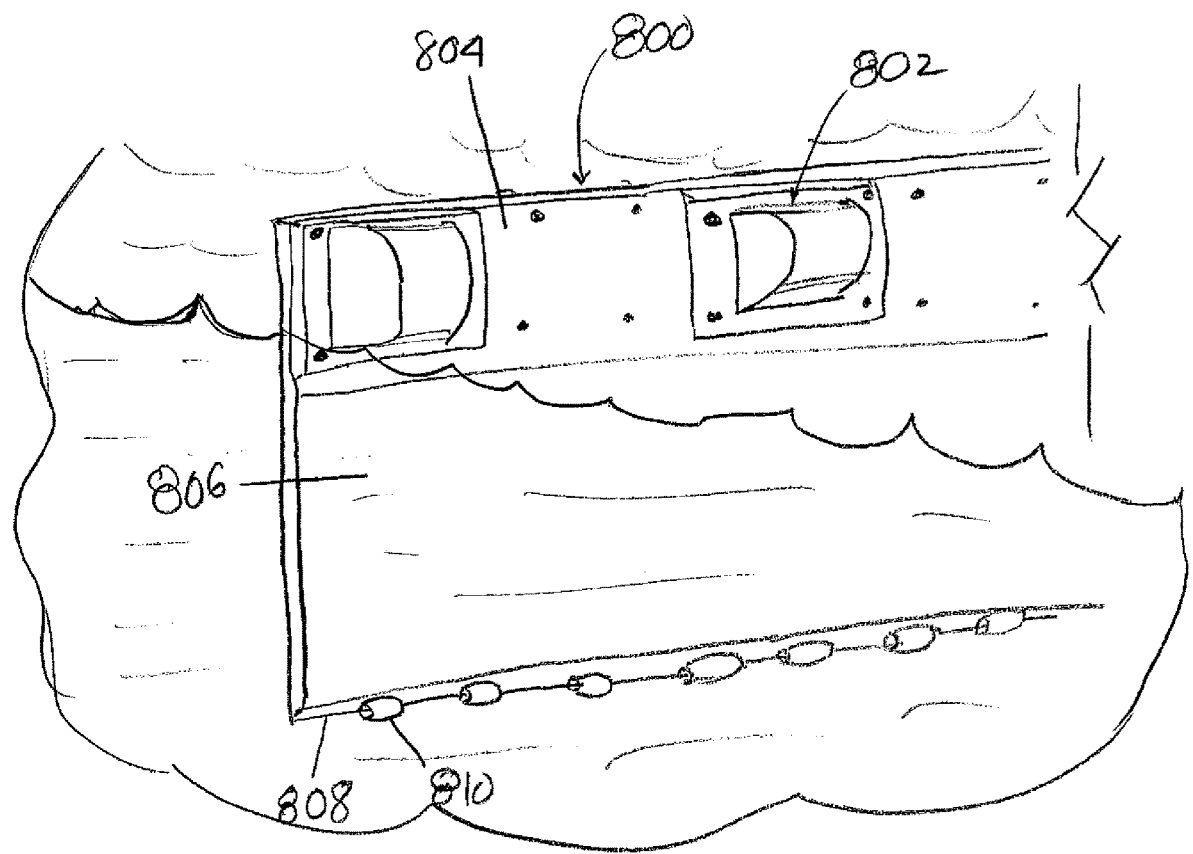
FIG. 22 schematically illustrates a fragmentary isometric view of an oil containment system according to at least one embodiment.

FIG. 22 schematically illustrates an oil containment boom 800 according to at least one embodiment. Boom 800 includes a flotation chamber 802 connected to a freeboard 804. Freeboard 804 is also connected to a skirt 806 that is draped into the water 6-10 feet. Skirt 806 is connected at the end opposite the freeboard 804 to a tension member 808. Tension member 808 supports a ballast member 810 which aids in keeping skirt 806 positioned upright in the water. Chambers 802 can be located on one side or both sides of freeboard 804.

Figure 23:
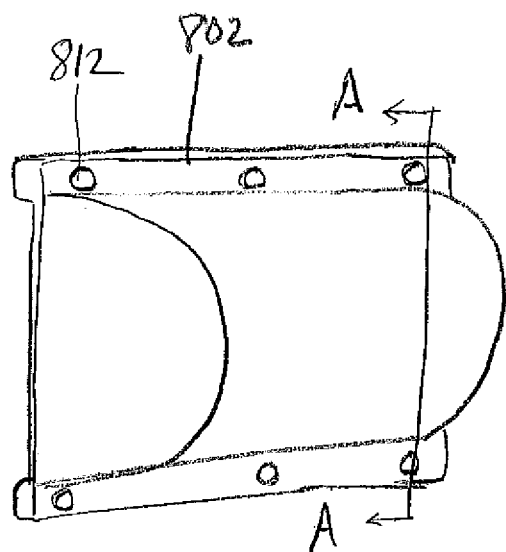
FIG. 23 schematically illustrates an oil containment system flotation chamber.

FIG. 23 schematically illustrates flotation chamber 802. A plurality of flotation chambers 802 are connected by fasteners through a plurality of apertures 812 in an alternating configuration to opposite sides of freeboard 804 in at least one embodiment. In another embodiment, the plurality of flotation chambers 802 are connected to one or more sides of the freeboard in order to provide sufficient buoyancy to keep freeboard 804 approximately upright in heavy swells at sea.

Figure 24:
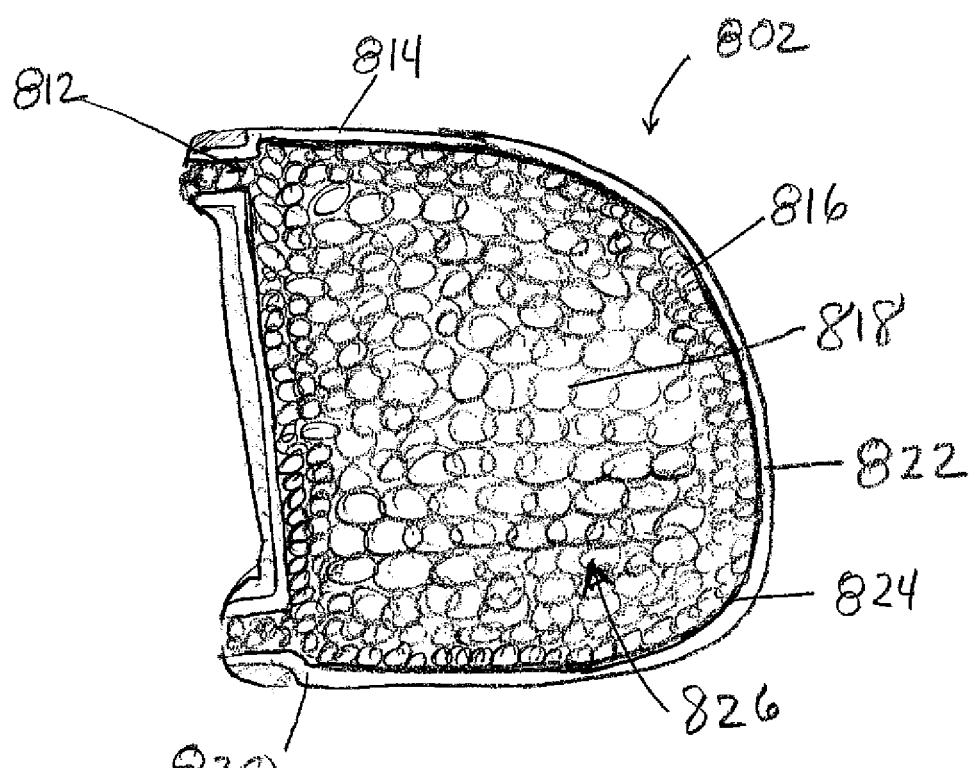
FIG. 24 schematically illustrates a cross-sectional view of an oil containment system flotation chamber along axis A-A of FIG. 23.

FIG. 24 schematically illustrates a cross-sectional view along axis A-A of FIG. 22. Flotation chamber 802 includes a wall 814 having a thermal bond 824 to an in-situ foam core 826. Thermal bond 824 includes a cooled connection having a molten or softened portion of wall 814, a molten or softened portion of in-situ foam core 826, and a co-mingled layer including wall 814 and in-situ foam core 826. In-situ foam core 826 includes a first density zone 816 having a greater density than a second density zone 818. Second density zone provides greater buoyancy is especially advantageous in seas with high waves or when a oil containment boom 800 is above average booms in weight. Apertures 812 can also experience extra stresses. In at least one embodiment, the blowmolding parison is fed more slowly or with more material into areas so as to increase the wall thickness in higher stress areas, such as area 820.

While exemplary embodiments are described above, it is not intended that these embodiments describe all possible forms of the invention. Rather, the words used in the specification awards a description rather than limitation, and it is understood that various changes may be made without departing from the scope and spirit of the invention. Additionally, features of the various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

What is claimed is:

1. A method for making a running board for a motor vehicle, the method comprising:
    extruding a vertically aligned elongate heated plastic tube between two mold sections which when closed form a mold cavity in the shape of a running board for a motor vehicle;
    closing the mold cavity and introducing pressurized gas into the heated plastic tube to blow mold the heated plastic tube into conformity with the mold cavity to form a plastic shell having a shell wall defining an internal cavity;
    inserting a plurality of spaced apart steam pins into the internal cavity projecting through the shell wall while still in the mold cavity;
    cutting a fill hole in an upper region of the plastic shell while still in the mold cavity;
    introducing pre-expanded polymer beads into the plastic shell through the fill hole;
    introducing steam into a first sub-group of the plurality of steam pins into the heated beads while evacuating the steam from a second sub-group of the plurality of steam pins;
    introducing steam into the second sub-group of the plurality of steam pins into the heated beads while evacuating the steam from the first sub-group of the plurality of steam pins;
    wherein the steaming steps heat the expanded polymer beads while the plastic shell is in the mold internal cavity causing the beads to partially melt, distort and fuse together forming a foam core having a layer of distorted beads adjacent to the shell wall forming a thermal bond to the shell wall;
    introducing pressurized air into a first sub-group of the plurality of steam pins while evacuating the air and evaporated steam condensate from a second sub-group of the plurality of steam pins to cool the foam core and plastic shell;
    introducing pressurized air into a second sub-group of the plurality of steam pins while evacuating the air and evaporated steam condensate from a first sub-group of the plurality of steam pins to further cool the foam core and plastic shell; and
    upon cooling the foam core and plastic shell withdrawing the steam pins, opening the mold and removing the plastic shell having its internal cavity filled with a foam core thermally bonded to the shell wall.

2. The method of claim 1, wherein pre-expanded polymer beads introduced into the plastic shell internal cavity comprises polypropylene.

3. The method of claim 1, wherein elongate heated plastic tube molded into the plastic shell comprises polypropylene.

4. The method of claim 3, wherein pre-expanded polymer beads introduced into the plastic shell internal cavity comprises polypropylene.

5. A method for making a running board for a motor vehicle, the method comprising:
    extruding a vertically aligned elongate heated plastic tube between two mold sections which when closed form a mold cavity in a shape of a running board for a motor vehicle;
    closing the mold cavity and introducing pressurized gas into the heated plastic tube to blow mold the heated plastic tube into conformity with the mold cavity to form a plastic shell having a shell wall defining an internal cavity;
    inserting a plurality of spaced apart steam pins into the internal cavity projecting through the plastic shell wall while still in the mold cavity;
    cutting a fill hole in an upper region of the plastic shell while still in the mold cavity;
    introducing pre-expanded polymer beads into the plastic shell through the fill hole;
    introducing steam into a first sub-group of the plurality of steam pins into the heated beads while evacuating the steam from a second sub-group of the plurality of steam pins;
    introducing steam into the second sub-group of the plurality of steam pins into the heated beads while evacuating the steam from the first sub-group of the plurality of steam pins;
    wherein the steaming steps heat the expanded polymer beads while the plastic shell is in the mold cavity causing the beads to partially melt, distort and fuse together forming a foam core having a layer of distorted beads adjacent to the shell wall forming a thermal bond to the shell wall;
    introducing pressurized air into one of the first or second sub-group of the plurality of steam pins while evacuating the air and evaporated steam condensate from the other first or second sub-group of the plurality of steam pins to cool the foam core and plastic shell; and
    upon cooling the foam core and plastic shell withdrawing the steam pins, opening the mold and removing the plastic shell having its internal cavity filled with a foam core thermally bonded to the shell wall.

6. The method of claim 5, wherein pre-expanded polymer beads introduced into the plastic shell internal cavity comprises polypropylene.

7. The method of claim 5, wherein elongate heated plastic tube molded into the plastic shell comprises polypropylene.

8. The method of claim 7, wherein pre-expanded polymer beads introduced into the plastic shell internal cavity comprises polypropylene.

* * * * *